(12) United States Patent
Yu

(10) Patent No.: US 11,431,447 B2
(45) Date of Patent: Aug. 30, 2022

(54) DATA TRANSMISSION METHOD AND APPARATUS, AND STORAGE MEDIUM

(71) Applicant: HUAWEI TECHNOLOGIES CO., LTD., Guangdong (CN)

(72) Inventor: Jian Yu, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/090,294

(22) Filed: Nov. 5, 2020

(65) Prior Publication Data

US 2021/0050962 A1 Feb. 18, 2021

Related U.S. Application Data

(63) Continuation of application No. PCT/CN2018/117421, filed on Nov. 26, 2018.

(30) Foreign Application Priority Data

May 7, 2018 (CN) .......................... 201810428304.6

(51) Int. Cl.
*H04L 5/00* (2006.01)
(52) U.S. Cl.
CPC .................. *H04L 5/0001* (2013.01)
(58) Field of Classification Search
None
See application file for complete search history.

(56) References Cited

U.S. PATENT DOCUMENTS

2015/0334708 A1* 11/2015 Lee .................. H04W 72/0446
370/329
2016/0021568 A1* 1/2016 Yu ......................... H04L 5/0048
370/329

(Continued)

FOREIGN PATENT DOCUMENTS

CN 104363192 A 2/2015
CN 106716913 A 5/2017

OTHER PUBLICATIONS

CATT,"LAA-WIFI co-existence evaluation results for outdoor scenario", 3GPP TSG RAN WG1 Meeting #80, R1-150108, Athens, Greece, Feb. 9-13, 2015, total 6 pages.

(Continued)

*Primary Examiner* — Shukri Taha
(74) *Attorney, Agent, or Firm* — Womble Bond Dickinson (US) LLP

(57) ABSTRACT

A transmit end sends a physical layer protocol data unit (PPDU) to a receive end, where a bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. A quantity of tones per 10-MHz tone distribution corresponding to the second part of fields is 128, and a tone spacing is 78.125 kHz. The corresponding method is applicable to 10 MHz, 20 MHz, 40 MHz, 60 MHz, so that a transmission bandwidth is increased compared with that of 802.11p, as well as a system throughput. The transmit end may transmit data by some RUs to increase a data transmission distance, or may simultaneously transmit data of different services by a plurality of RUs to improve data transmission efficiency.

16 Claims, 25 Drawing Sheets

(56) References Cited

U.S. PATENT DOCUMENTS

| | | | |
|---|---|---|---|
| 2016/0066338 A1* | 3/2016 | Kwon .................. | H04L 5/0091 370/330 |
| 2016/0150514 A1* | 5/2016 | Kwon ............... | H04W 74/0816 370/329 |
| 2017/0272138 A1* | 9/2017 | Chun .................... | H04L 69/323 |
| 2019/0173710 A1* | 6/2019 | Cao ....................... | H04L 5/0094 |

OTHER PUBLICATIONS

IEEE Std 802.11—2016, IEEE, 3 Park Avenue, New York, NY 10016-5997, USA, total 3534 pages.
IEEE P802 11ax /D2.2, Feb. 2018, Copyright 2018 by the IEEE. Three Park Avenue New York, New York 10016-5997, USAAll rights reserved, total 620 pages.

* cited by examiner

| STF | LTF | SIG | Data |
|---|---|---|---|
FIG. 1
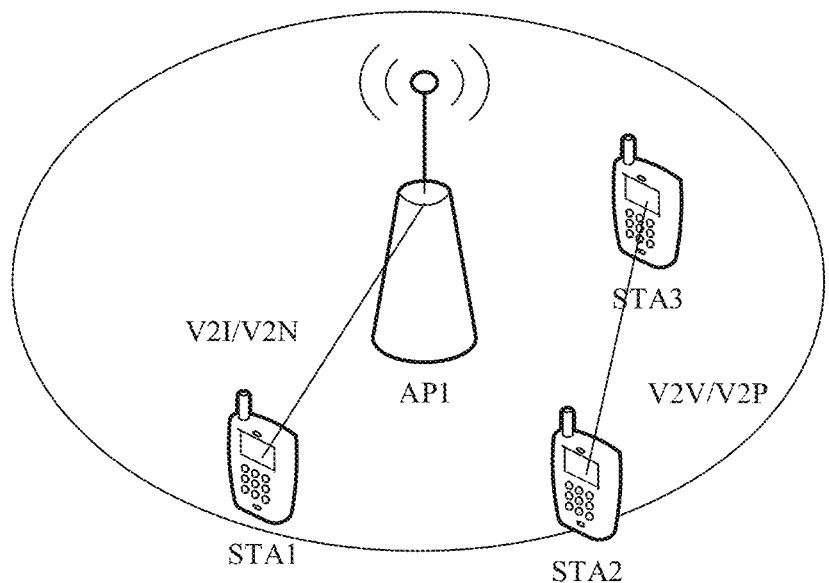
FIG. 2
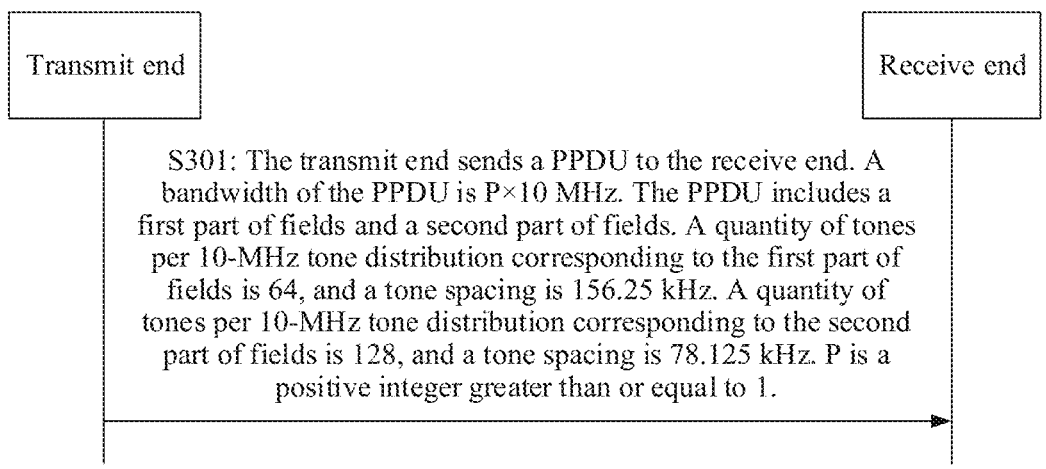
FIG. 3

| 40 MHz | L-STF | L-LTF | L-SIG | RL-SIG | Signal field A | Signal field B (CC 1) | First training field | Second training field | Data |
|---|---|---|---|---|---|---|---|---|---|
| | L-STF | L-LTF | L-SIG | RL-SIG | Signal field A | Signal field B (CC 2) | | | |
| | L-STF | L-LTF | L-SIG | RL-SIG | Signal field A | Signal field B (CC 1) | First training field | Second training field | Data |
| | L-STF | L-LTF | L-SIG | RL-SIG | Signal field A | Signal field B (CC 2) | | | |

FIG. 18B

| | | | | | | |
|---|---|---|---|---|---|---|
| L-STF | L-LTF | L-SIG | RL-SIG | Signal field A | Signal field B (CC 1) | First training field | Second training field | Data |
| L-STF | L-LTF | L-SIG | RL-SIG | Signal field A | Signal field B (CC 2) | ||| 
| L-STF | L-LTF | L-SIG | RL-SIG | Signal field A | Signal field B (CC 3) | First training field | Second training field | Data |
| L-STF | L-LTF | L-SIG | RL-SIG | Signal field A | Signal field B (CC 4) | |||

40 MHz

FIG. 18C

| L-STF | L-LTF | L-SIG | RL-SIG | Signal field A | Signal field B | First training field | Second training field | Data |
|---|---|---|---|---|---|---|---|---|
| L-STF | L-LTF | L-SIG | RL-SIG | Signal field A | Signal field B | | | |

20 MHz

FIG. 18D

| L-STF | L-LTF | L-SIG | RL-SIG | Signal field A | Signal field B (CC 1) | First training field | Second training field | Data |
|---|---|---|---|---|---|---|---|---|
| L-STF | L-LTF | L-SIG | RL-SIG | Signal field A | | | | |
| L-STF | L-LTF | L-SIG | RL-SIG | Signal field A | Signal field B (CC 2) | First training field | Second training field | Data |
| L-STF | L-LTF | L-SIG | RL-SIG | Signal field A | | | | |

40 MHz

FIG. 19B

| L-STF | L-LTF | L-SIG | RL-SIG | Signal field A | Signal field B (CC 1) | First training field | Second training field | Data |
|---|---|---|---|---|---|---|---|---|
| L-STF | L-LTF | L-SIG | RL-SIG | Signal field A | | | | |
| L-STF | L-LTF | L-SIG | RL-SIG | Signal field A | Signal field B (CC 2) | First training field | Second training field | Data |
| L-STF | L-LTF | L-SIG | RL-SIG | Signal field A | | | | |
| L-STF | L-LTF | L-SIG | RL-SIG | Signal field A | Signal field B (CC 1) | First training field | Second training field | Data |
| L-STF | L-LTF | L-SIG | RL-SIG | Signal field A | | | | |
| L-STF | L-LTF | L-SIG | RL-SIG | Signal field A | Signal field B (CC 2) | First training field | Second training field | Data |
| L-STF | L-LTF | L-SIG | RL-SIG | Signal field A | | | | |

80 MHz

FIG. 19C

| L-STF | L-LTF | L-SIG | RL-SIG | Signal field A | Signal field B (CC 1) | First training field | Second training field | Data |
|---|---|---|---|---|---|---|---|---|
| L-STF | L-LTF | L-SIG | RL-SIG | Signal field A | | | | |
| L-STF | L-LTF | L-SIG | RL-SIG | Signal field A | Signal field B (CC 2) | First training field | Second training field | Data |
| L-STF | L-LTF | L-SIG | RL-SIG | Signal field A | | | | |
| L-STF | L-LTF | L-SIG | RL-SIG | Signal field A | Signal field B (CC 3) | First training field | Second training field | Data |
| L-STF | L-LTF | L-SIG | RL-SIG | Signal field A | | | | |
| L-STF | L-LTF | L-SIG | RL-SIG | Signal field A | Signal field B (CC 4) | First training field | Second training field | Data |
| L-STF | L-LTF | L-SIG | RL-SIG | Signal field A | | | | |

FIG. 19D

| L-STF | L-LTF | L-SIG | RL-SIG | Signal field A | First training field | Second training field | Security-related service (RU 1) | PE |

FIG. 20

DATA TRANSMISSION METHOD AND APPARATUS, AND STORAGE MEDIUM

CROSS-REFERENCE TO RELATED APPLICATIONS

This application is a continuation of International Application No. PCT/CN2018/117421, filed on Nov. 26, 2018, which claims priority to Chinese Patent Application No. 201810428304.6, filed on May 7, 2018. The disclosures of the aforementioned applications are hereby incorporated by reference in their entireties.

TECHNICAL FIELD

This application relates to the field of communications technologies, and in particular, to a data transmission method and apparatus, and a storage medium.

BACKGROUND

The 802.11p task group of the 802.11 standard designs a corresponding communications system for vehicle to everything (V2X) on the Internet of vehicles. FIG. 1 is a schematic diagram of a physical protocol data unit (PPDU) defined in the 802.11p standard. As shown in FIG. 1, a data packet includes a preamble and data. The preamble includes: a short training field (STF), used for data packet detection, coarse frequency and time synchronization, and automatic gain control (AGC); a long training field (LTF), used for channel estimation and fine frequency and time synchronization; and a signal field (SIG), including related signaling information and used to indicate a length and a rate of a data field. In the 802.11p standard, 10 megahertz (MHz) is used as a basic bandwidth. Correspondingly, a tone spacing is: 10 MHz/64=156.25 kilohertz (kHz). A symbol length is 8 microseconds (microseconds, μs), including a guard interval (GI) of 1.6 us and a fast Fourier transform (FFT) part of 6.4 μs. A longer GI and a longer symbol length make a physical layer of 802.11p more suitable for Internet of vehicles communications.

However, to obtain road condition information, a vehicle usually needs a throughput of 10 megabits per second (Mbps), and for self-driving, a throughput of 750 Mbps may be required. Currently, an 802.11p-based Internet of vehicles system has a comparatively low throughput.

SUMMARY

This application provides a data transmission method and apparatus, and a storage medium, to improve a system throughput.

According to a first aspect, this application provides a data transmission method, including: A transmit end sends a PPDU to a receive end. A bandwidth of the PPDU is P×10 megahertz MHz. The PPDU includes a first part of fields and a second part of fields. A quantity of tones per 10-MHz tone distribution corresponding to the first part of fields is 64, and a tone spacing is 156.25 kHz. A quantity of tones per 10-MHz tone distribution corresponding to the second part of fields is 128, and a tone spacing is 78.125 kHz. P is a positive integer greater than or equal to 1.

According to a second aspect, this application provides a data transmission method, including: A receive end receives a PPDU sent by a transmit end. A bandwidth of the PPDU is P×10 megahertz MHz. The PPDU includes a first part of fields and a second part of fields. A quantity of tones per 10-MHz tone distribution corresponding to the first part of fields is 64, and a tone spacing is 156.25 kHz. A quantity of tones per 10-MHz tone distribution corresponding to the second part of fields is 128, and a tone spacing is 78.125 kHz. P is a positive integer greater than or equal to 1.

In an embodiment, because the data transmission method provided in this application is applicable to 10 MHz, 20 MHz, 40 MHz, 60 MHz, and the like, a transmission bandwidth is increased compared with that of 802.11p, and therefore a system throughput is increased. In addition, the transmit end may transmit data by using some RUs to increase a data transmission distance, or may simultaneously transmit data of different services by using a plurality of RUs to improve data transmission efficiency.

In an embodiment, each 10-MHz tone distribution corresponding to the second part of fields includes M1 26-tone RUs, M2 52-tone RUs, M3 106-tone RUs, M4 guard tones, M5 null tones, and M6 direct current tones. M1×26+M2×52+M3×106+M4+M5+M6=128. M1, M2, M3, M4, M5, and M6 are integers greater than or equal to 0.

In an embodiment, M1=4, M2=0, M3=0, and M4+M5+M6=24. M41 guard tones and M42 guard tones are provided on two sides of the four 26-tone RUs, and M41+M42=M4.

Alternatively, M1=0, M2=2, M3=0, and M4+M5+M6=24. M43 guard tones and M44 guard tones are provided on two sides of the two 52-tone RUs, and M43+M44=M4.

Alternatively, M1=0, M2=0, M3=1, and M4+M5+M6=22. M45 guard tones and M46 guard tones are provided on two sides of the two 52-tone RUs, and M45+M46=M4.

Alternatively, M1=2, M2=1, M3=0, and M4+M5+M6=24. M47 guard tones and M48 guard tones are provided on two sides of the two 26-tone RUs and the one 52-tone RU, and M47+M48=M4.

In an embodiment, M1=4, M2=0, M3=0, M41=9, M42=8, M5=2, and M6=5.

Alternatively, M1=0, M2=2, M3=0, M43=9, M44=8, M5=2, and M6=5.

Alternatively, M1=0, M2=0, M3=1, M45=9, M46=8, M5=0, and M6=5.

Alternatively, M1=2, M2=1, M3=0, M47=9, M48=8, M5=2, and M6=5.

In an embodiment, when M41=9 and M42=8, M41 guard tones fall within [−64, −56], and M42 guard tones fall within [56, 63]; or M41 guard tones fall within [56, 63], and M42 guard tones fall within [−64, −56].

When M43=9 and M44=8, M43 guard tones fall within [−64, −56], and M44 guard tones fall within [56, 63]; or M43 guard tones fall within [56, 63], and M44 guard tones fall within [−64, −56].

When M45=9 and M46=8, M45 guard tones fall within [−64, −56], and M46 guard tones fall within [56, 63]; or M45 guard tones fall within [56, 63], and M46 guard tones fall within [−64, −56].

When M47=9 and M48=8, M47 guard tones fall within [−64, −56], and M48 guard tones fall within [56, 63]; or M47 guard tones fall within [56, 63], and M48 guard tones fall within [−64, −56].

In an embodiment, the first part of fields include resource indication information. The resource indication information is used to indicate resource unit RU allocation within a range of one or more 106-tone RUs, or the resource indication information is used to indicate RU allocation within a range of one or more 242-tone RUs.

When the resource indication information is used to indicate RU allocation within a range of one or more 242-tone RUs, for RU allocation within a range of any 242-tone RU, the resource indication information includes a first resource indication subfield, a second resource indication subfield, and a third resource indication subfield. The first resource indication subfield is used to indicate an RU allocation status on a first 106-tone RU in the 242-tone RU. The second resource indication subfield is used to indicate an RU allocation status on a second 106-tone RU in the 242-tone RU. The third resource indication subfield is used to indicate an allocation status on a 26-tone RU between the first 106-tone RU and the second 106-tone RU.

Alternatively, the resource indication information is replicated on two 10-MHz bandwidths corresponding to the 242-tone RU.

The resource indication information may be applied to an OFDMA scenario, and the transmit end may transmit data by using some RUs to increase a data transmission distance, or simultaneously transmit different services by using a plurality of RUs to improve air interface efficiency.

In an embodiment, the first part of fields include a signal field A. The signal field A carries signaling information used for parsing the PPDU.

The signal field A occupies one symbol.

Alternatively, the signal field A occupies two symbols. The signal field A has same signaling information and a same interleaving mode on the two symbols.

Alternatively, the signal field A occupies two symbols. The signal field A has same signaling information and different interleaving modes on the two symbols.

System overheads can be reduced when the signal field A occupies one symbol. When the signal field A occupies two symbols, information in a second symbol is the same as that in a first symbol, and a replication manner is used between the two symbols. Alternatively, when the signal field A occupies two symbols, a non-interleaving mode is used for a second symbol, that is, no interleaving is performed, so that frequency diversity is formed between the second symbol and a first symbol, thereby enhancing robustness. Compared with a non-HE ER SU mode, this enhances robustness with same overheads. Compared with an HE ER SU mode, this further reduces overheads.

In an embodiment, the first part of fields include an L-LTF, the second part of fields include a training field, and the training field and the L-LTF are jointly used for channel measurement in a space time block coding STBC scenario.

The training field occupies one symbol. The L-LTF is multiplied by a first column of a matrix $P_{2*2}$. The training field is multiplied by a second column of the matrix $P_{2*2}$. The matrix P is used to distinguish between a first space-time stream and a second space-time stream, where $$P_{2*2} = \begin{bmatrix} 1 & -1 \\ 1 & 1 \end{bmatrix}.$$

The PPDU includes only one training field, and AGC is performed through L-STF multiplexing, so that overheads can be further reduced.

According to a third aspect, this application provides a data transmission method, including: A transmit end sends a PPDU to a receive end. A bandwidth of the PPDU is P×10 MHz. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones per 10-MHz tone distribution corresponding to the third part of fields is 128, and a tone spacing is 78.125 kHz. P is a positive integer greater than or equal to 2.

According to a fourth aspect, this application provides a data transmission method, including: A receive end receives a PPDU sent by a transmit end. A bandwidth of the PPDU is P×10 MHz. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones per 10-MHz tone distribution corresponding to the third part of fields is 128, and a tone spacing is 78.125 kHz. P is a positive integer greater than or equal to 2.

In an embodiment, because the data transmission method provided in this application is applicable to 10 MHz, 20 MHz, 40 MHz, 60 MHz, and the like, a transmission bandwidth is increased compared with that of 802.11p, and therefore a system throughput is increased. In addition, the transmit end may transmit data by using some RUs to increase a data transmission distance, or may simultaneously transmit data of different services by using a plurality of RUs to improve data transmission efficiency.

In an embodiment, each 10-MHz tone distribution corresponding to the third part of fields includes M1 26-tone RUs, M2 52-tone RUs, M3 106-tone RUs, M4 guard tones, M5 null tones, and M6 direct current tones. M1×26+M2×52+M3×106+M4+M5+M6=128. M1, M2, M3, M4, M5, and M6 are integers greater than or equal to 0.

In an embodiment, M1=4, M2=0, M3=0, and M4+M5+M6=24. M41 guard tones and M42 guard tones are provided on two sides of the four 26-tone RUs, and M41+M42=M4.

Alternatively, M1=0, M2=2, M3=0, and M4+M5+M6=24. M43 guard tones and M44 guard tones are provided on two sides of the two 52-tone RUs, and M43+M44=M4.

Alternatively, M1=0, M2=0, M3=1, and M4+M5+M6=22. M45 guard tones and M46 guard tones are provided on two sides of the two 52-tone RUs, and M45+M46=M4.

Alternatively, M1=2, M2=1, M3=0, and M4+M5+M6=24. M47 guard tones and M48 guard tones are provided on two sides of the two 26-tone RUs and the one 52-tone RU, and M47+M48=M4.

In an embodiment, M1=4, M2=0, M3=0, M41=9, M42=8, M5=2, and M6=5.

Alternatively, M1=0, M2=2, M3=0, M43=9, M44=8, M5=2, and M6=5.

Alternatively, M1=0, M2=0, M3=1, M45=9, M46=8, M5=0, and M6=5.

Alternatively, M1=2, M2=1, M3=0, M47=9, M48=8, M5=2, and M6=5.

Optionally, when M41=9 and M42=8, M41 guard tones fall within [−64, −56], and M42 guard tones fall within [56, 63]; or M41 guard tones fall within [56, 63], and M42 guard tones fall within [−64, −56].

When M43=9 and M44=8, M43 guard tones fall within [−64, −56], and M44 guard tones fall within [56, 63]; or M43 guard tones fall within [56, 63], and M44 guard tones fall within [−64, −56].

When M45=9 and M46=8, M45 guard tones fall within [−64, −56], and M46 guard tones fall within [56, 63]; or M45 guard tones fall within [56, 63], and M46 guard tones fall within [−64, −56].

When M47=9 and M48=8, M47 guard tones fall within [−64, −56], and M48 guard tones fall within [56, 63]; or M47 guard tones fall within [56, 63], and M48 guard tones fall within [−64, −56].

In an embodiment, the first part of fields include resource indication information. The resource indication information is used to indicate resource unit RU allocation within a range of one or more 106-tone RUs, or the resource indication information is used to indicate RU allocation within a range of one or more 242-tone RUs.

When the resource indication information is used to indicate RU allocation within a range of one or more 242-tone RUs, for RU allocation within a range of any 242-tone RU, the resource unit indication information includes a first resource indication subfield, a second resource indication subfield, and a third resource indication subfield. The first resource indication subfield is used to indicate an RU allocation status on a first 106-tone RU in the 242-tone RU. The second resource indication subfield is used to indicate an RU allocation status on a second 106-tone RU in the 242-tone RU. The third resource indication subfield is used to indicate an allocation status on a 26-tone RU between the first 106-tone RU and the second 106-tone RU.

Alternatively, the resource indication information is replicated on two 10-MHz bandwidths corresponding to the 242-tone RU.

The resource indication information may be applied to an OFDMA scenario, and the transmit end may transmit data by using some RUs to increase a data transmission distance, or simultaneously transmit different services by using a plurality of RUs to improve air interface efficiency.

In an embodiment, the first part of fields include a signal field A. The signal field A carries signaling information used for parsing the PPDU.

The signal field A occupies one symbol.

Alternatively, the signal field A occupies two symbols. The signal field A has same signaling information and a same interleaving mode on the two symbols.

Alternatively, the signal field A occupies two symbols. The signal field A has same signaling information and different interleaving modes on the two symbols.

Beneficial effects of this application include: System overheads can be reduced when the signal field A occupies one symbol. When the signal field A occupies two symbols, information in a second symbol is the same as that in a first symbol, and a replication manner is used between the two symbols. Alternatively, when the signal field A occupies two symbols, a non-interleaving mode is used for a second symbol, that is, no interleaving is performed, so that frequency diversity is formed between the second symbol and a first symbol, thereby enhancing robustness. Compared with a non-HE ER SU mode, this enhances robustness with same overheads. Compared with an HE ER SU mode, this further reduces overheads.

In an embodiment, the first part of fields include an L-LTF, the second part of fields include a training field, and the training field and the L-LTF are jointly used for channel measurement in an STBC scenario.

The training field occupies one symbol, the L-LTF is multiplied by a first column of a matrix $P_{2*2}$ the training field is multiplied by a second column of the matrix $P_{2*2}$ and the matrix P is used to distinguish between a first space-time stream and a second space-time stream, where $$P_{2*2} = \begin{bmatrix} 1 & -1 \\ 1 & 1 \end{bmatrix}.$$

The PPDU includes only one training field, and AGC is performed through L-STF multiplexing, so that overheads can be further reduced.

According to a fifth aspect, this application provides a data transmission apparatus, the apparatus has a function of implementing actual behavior of the transmit end in the first aspect or the optional methods of the first aspect. The function may be implemented by hardware, or may be implemented by hardware executing corresponding software. The hardware or software includes one or more modules corresponding to the function.

According to a sixth aspect, this application provides a data transmission apparatus, the apparatus has a function of implementing actual behavior of the receive end in the second aspect or the optional methods of the second aspect. The function may be implemented by hardware, or may be implemented by hardware executing corresponding software. The hardware or software includes one or more modules corresponding to the function.

According to a seventh aspect, this application provides a data transmission apparatus, the apparatus has a function of implementing actual behavior of the transmit end in the third aspect or the optional methods of the third aspect. The function may be implemented by hardware, or may be implemented by hardware executing corresponding software. The hardware or software includes one or more modules corresponding to the function.

According to an eighth aspect, this application provides a data transmission apparatus, the apparatus has a function of implementing actual behavior of the receive end in the fourth aspect or the optional methods of the fourth aspect. The function may be implemented by hardware, or may be implemented by hardware executing corresponding software. The hardware or software includes one or more modules corresponding to the function.

According to a ninth aspect, this application provides a data transmission apparatus. A structure of the apparatus includes a processor and a transmitter. The processor is configured to support the apparatus in performing a corresponding function in the first aspect or the optional methods of the first aspect. The transmitter is configured to support communication between the apparatus and a receive end, and send information or an instruction in the foregoing methods to the receive end. The apparatus may further include a memory. The memory is configured to be coupled to the processor, and the memory stores a program instruction and data that are necessary for the apparatus.

According to a tenth aspect, this application provides a data transmission apparatus. A structure of the apparatus includes a processor and a receiver. The processor is configured to support the apparatus in performing a corresponding function in the second aspect or the optional methods of the second aspect. The receiver is configured to support communication between the apparatus and a transmit end, and receive information or an instruction sent by the transmit end. The apparatus may further include a memory. The memory is configured to be coupled to the processor, and the memory stores a program instruction and data that are necessary for the apparatus.

According to an eleventh aspect, this application provides a data transmission apparatus. A structure of the apparatus includes a processor and a transmitter. The processor is configured to support the apparatus in performing a corresponding function in the third aspect or the optional methods of the third aspect. The transmitter is configured to support communication between the apparatus and a receive end, and send information or an instruction in the foregoing methods to the receive end. The apparatus may further include a memory. The memory is configured to be coupled to the processor, and the memory stores a program instruction and data that are necessary for the apparatus.

According to a twelfth aspect, this application provides a data transmission apparatus. A structure of the apparatus includes a processor and a receiver. The processor is configured to support the apparatus in performing a corresponding function in the fourth aspect or the optional methods of the fourth aspect. The receiver is configured to support communication between the apparatus and a transmit end, and receive information or an instruction sent by the transmit end. The apparatus may further include a memory. The memory is configured to be coupled to the processor, and the memory stores a program instruction and data that are necessary for the apparatus.

According to a thirteenth aspect, this application provides a computer storage medium, including a program instruction. The program instruction is used to implement the data transmission method in the first aspect or the optional manners of the first aspect.

According to a fourteenth aspect, this application provides a computer storage medium, including a program instruction. The program instruction is used to implement the data transmission method in the second aspect or the optional manners of the second aspect.

According to a fifteenth aspect, this application provides a computer storage medium, including a program instruction. The program instruction is used to implement the data transmission method in the third aspect or the optional manners of the third aspect.

According to a sixteenth aspect, this application provides a computer storage medium, including a program instruction. The program instruction is used to implement the data transmission method in the fourth aspect or the optional manners of the fourth aspect.

According to a seventeenth aspect, this application provides a computer program product, including a program instruction. The program instruction is used to implement the data transmission method in the first aspect or the optional manners of the first aspect.

According to an eighteenth aspect, this application provides a computer program product, including a program instruction. The program instruction is used to implement the data transmission method in the second aspect or the optional manners of the second aspect.

According to a nineteenth aspect, this application provides a computer program product, including a program instruction. The program instruction is used to implement the data transmission method in the third aspect or the optional manners of the third aspect.

According to a twentieth aspect, this application provides a computer program product, including a program instruction. The program instruction is used to implement the data transmission method in the fourth aspect or the optional manners of the fourth aspect.

According to a twenty-first aspect, this application provides a resource indication method, including:

A transmit end sends resource indication information to a receive end. The resource indication information is used to indicate resource unit RU allocation within a range of one or more 106-tone RUs, or the resource indication information is used to indicate RU allocation within a range of one or more 242-tone RUs.

In an embodiment, when the resource indication information is used to indicate RU allocation within a range of one 242-tone RU, the resource unit indication information includes a first resource indication subfield, a second resource indication subfield, and a third resource indication subfield. The first resource indication subfield is used to indicate an RU allocation status on a first 106-tone RU in the 242-tone RU. The second resource indication subfield is used to indicate an RU allocation status on a second 106-tone RU in the 242-tone RU. The third resource indication subfield is used to indicate an allocation status on a 26-tone RU between the first 106-tone RU and the second 106-tone RU.

In an embodiment, the resource indication information is replicated on two 10-MHz bandwidths corresponding to the 242-tone RU.

The resource indication information may be applied to an OFDMA scenario, and the transmit end may transmit data by using some RUs to increase a data transmission distance, or simultaneously transmit different services by using a plurality of RUs to improve air interface efficiency.

According to a twenty-second aspect, this application provides a data transmission apparatus, the apparatus has a function of implementing actual behavior of the receive end in the twenty-first aspect or the optional methods of the twenty-first aspect. The function may be implemented by hardware, or may be implemented by hardware executing corresponding software. The hardware or software includes one or more modules corresponding to the function.

According to a twenty-third aspect, this application provides a data transmission apparatus. A structure of the apparatus includes a processor and a transmitter. The processor is configured to support the apparatus in performing a corresponding function in the twenty-first aspect or the optional methods of the twenty-first aspect. The transmitter is configured to support communication between the apparatus and a receive end, and send information or an instruction in the foregoing methods to the receive end. The apparatus may further include a memory. The memory is configured to be coupled to the processor, and the memory stores a program instruction and data that are necessary for the apparatus.

According to a twenty-fourth aspect, this application provides a computer storage medium, including a program instruction. The program instruction is used to implement the data transmission method in the twenty-first aspect or the optional manners of the twenty-first aspect.

According to a twenty-fifth aspect, this application provides a computer program product, including a program instruction. The program instruction is used to implement the data transmission method in the twenty-first aspect or the optional manners of the twenty-first aspect.

This application provides the data transmission method and apparatus, and the storage medium. First, because the data transmission method provided in this application is applicable to 10 MHz, 20 MHz, 40 MHz, 60 MHz, and the like, a transmission bandwidth is increased compared with that of 802.11p, and therefore a system throughput is increased. Second, the transmit end may transmit data by using some RUs to increase a data transmission distance, or may simultaneously transmit data of different services by using a plurality of RUs to improve air interface efficiency or data transmission efficiency. Further, system overheads can be reduced when the signal field A occupies one symbol.

When the signal field A occupies two symbols, information in a second symbol is the same as that in a first symbol, and a replication manner is used between the two symbols. Alternatively, when the signal field A occupies two symbols, a non-interleaving mode is used for a second symbol, that is, no interleaving is performed, so that frequency diversity is formed between the second symbol and a first symbol, thereby enhancing robustness. Compared with a non-HE ER SU mode, this enhances robustness with same overheads. Compared with an HE ER SU mode, this further reduces overheads. Finally, the PPDU includes only one training field, and AGC is performed through L-STF multiplexing, so that overheads can be further reduced.

BRIEF DESCRIPTION OF DRAWINGS

FIG. 1 is a schematic diagram of a PPDU defined in the 802.11p standard;

FIG. 2 is a diagram of an application scenario of a technical solution of this application according to an embodiment of this application;

FIG. 3 is a flowchart of a data transmission method according to an embodiment of this application;

FIG. 18B is a schematic structural diagram of a 40-MHz PPDU with two content channels;

FIG. 18C is a schematic structural diagram of a 40-MHz PPDU with four content channels;

FIG. 18D is a schematic structural diagram of a 20-MHz PPDU with one content channel;

FIG. 19B is a schematic structural diagram of a 40-MHz PPDU according to an embodiment of this application;

FIG. 19C is a schematic structural diagram of an 80-MHz PPDU according to an embodiment of this application;

FIG. 19D is a schematic structural diagram of another 80-MHz PPDU according to an embodiment of this application;

FIG. 20 is a schematic diagram of a PPDU according to an embodiment of this application;

DESCRIPTION OF EMBODIMENTS

As described above, to obtain road condition information, a vehicle usually needs a throughput of 10 Mbps, and for self-driving, a throughput of 750 Mbps may be required. Currently, an 802.11p-based Internet of vehicles system has a comparatively low throughput. To resolve this technical problem, this application provides a data transmission method and apparatus, and a storage medium. FIG. 2 is a diagram of an application scenario of a technical solution of this application according to an embodiment of this application. As shown in FIG. 2, this technical solution of this application is applicable to single-user uplink/downlink transmission and multi-user uplink/downlink transmission, and is also applicable to device-to-device (D2D), vehicle-to-infrastructure (V2I), vehicle-to-network (V2N), vehicle-to-vehicle (V2V), vehicle-to-pedestrian (V2P), and vehicle-to-everything (V2x) communications systems, and the like. Based on this, a transmit end in this application may be an AP or a STA, and a receive end may be a STA. Alternatively, a transmit end may be a STA, and a receive end may be a STA, an AP, or the like. This is not limited in this application.

Embodiment 1

FIG. 3 is a flowchart of a data transmission method according to an embodiment of this application. As shown in FIG. 3, the method includes the following operations:

Operation S301: A transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. A quantity of tones per 10-MHz tone distribution corresponding to the second part of fields is 128, and a tone spacing is 78.125 kHz. P is a positive integer greater than or equal to 1.

Figure 4:
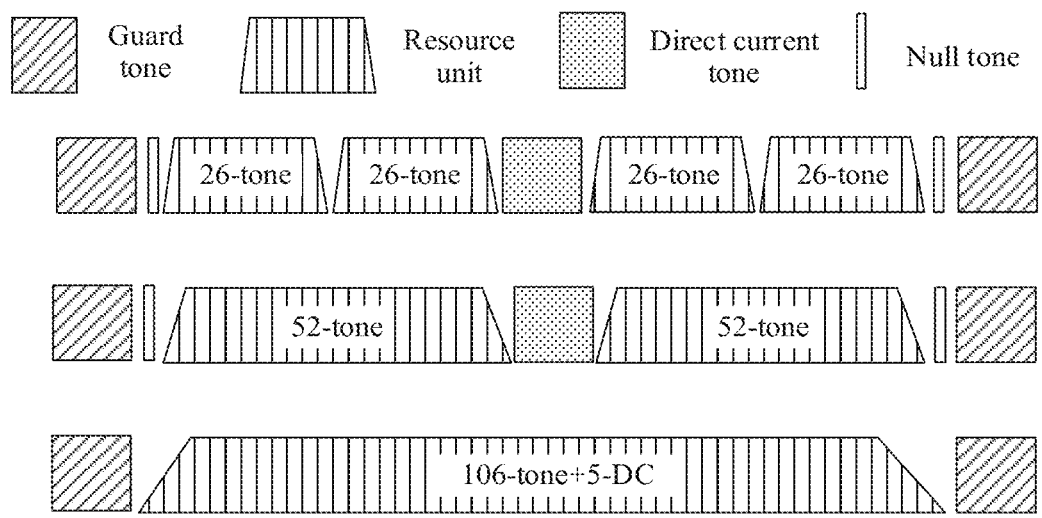
FIG. 4 is an example distribution diagram of 128 tones on 10 MHz according to an embodiment of this application.

In an embodiment, a quantity of tones in a tone distribution per 10-MHz frequency-domain resource corresponding to the second part of fields is 128, and a tone spacing is 78.125 kHz. FIG. 4 is an example distribution diagram of 128 tones on 10 MHz according to an embodiment of this application. As shown in FIG. 4, each 10-MHz tone distribution corresponding to the second part of fields includes M1 26-tone resource units (RUs), M2 52-tone RUs, M3 106-tone RUs, M4 guard tones, M5 null tones, and M6 direct current (DC) tones. M1×26+M2×52+M3×106+M4+M5+M6=128. M1, M2, M3, M4, M5 and M6 are integers greater than or equal to 0.

In an embodiment, M1=4, M2=0, M3=0, and M4+M5+M6=24. M41 guard tones and M42 guard tones are provided on two sides of the four 26-tone RUs, and M41+M42=M4.

Alternatively, M1=0, M2=2, M3=0, and M4+M5+M6=24. M43 guard tones and M44 guard tones are provided on two sides of the two 52-tone RUs, and M43+M44=M4.

Alternatively, M1=0, M2=0, M3=1, and M4+M5+M6=22. M45 guard tones and M46 guard tones are provided on two sides of the two 52-tone RUs, and M45+M46=M4.

Alternatively, M1=2, M2=1, M3=0, and M4+M5+M6=24. M47 guard tones and M48 guard tones are provided on two sides of the two 26-tone RUs and the one 52-tone RU, and M47+M48=M4.

In other words, guard tones are distributed on two sides of a 26-tone RU, a 52-tone RU, or a 106-tone RU.

Figure 5:
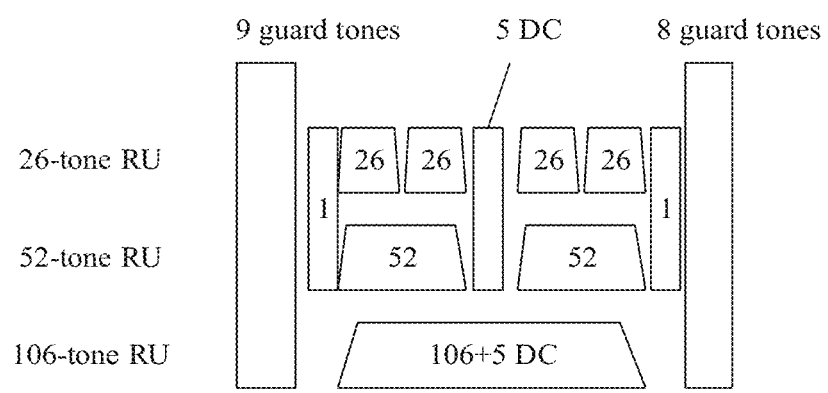
FIG. 5 is an example distribution diagram of 128 tones on 10 MHz according to an embodiment of this application.

For example, FIG. 5 is an example distribution diagram of 128 tones on 10 MHz according to an embodiment of this application. As shown in FIG. 5, M1=4, M2=0, M3=0, M41=9, M42=8, M5=2, and M6=5; or M1=0, M2=2, M3=0, M43=9, M44=8, M5=2, and M6=5; or M1=0, M2=0, M3=1, M45=9, M46=8, M5=0, and M6=5. One 106-tone RU may include 102 data tones and four pilot tones. As shown in FIG. 5, guard tones are evenly distributed on two sides of a 26-tone RU, a 52-tone RU, or a 106-tone RU. Null tones may be alternatively located between RUs or on two sides of a DC tone. This is not limited in this application.

In a 10-MHz frequency-domain resource, index numbers of 128 tones are [−64, 63].

When M41=9 and M42=8, in an example, M41 guard tones may fall within [−64, −56], and M42 guard tones may fall within [56, 63]; in another example, M41 guard tones may fall within [56, 63], and M42 guard tones may fall within [−64, −56].

When M43=9 and M44=8, in an example, M43 guard tones may fall within [−64, −56], and M44 guard tones may fall within [56, 63]; in another example, M43 guard tones may fall within [56, 63], and M44 guard tones may fall within [−64, −56].

When M45=9 and M46=8, in an example, M45 guard tones may fall within [−64, −56], and M46 guard tones may fall within [56, 63]; in another example, M45 guard tones may fall within [56, 63], and M46 guard tones may fall within [−64, −56].

When M47=9 and M48=8, in an example, M47 guard tones fall within [−64, −56], and M48 guard tones fall within [56, 63]; in another example, M47 guard tones fall within [56, 63], and M48 guard tones fall within [−64, −56].

It should be noted that a guard tone is mainly used to prevent out-of-band interference, a DC tone is mainly used to prevent DC component interference and the like, and the DC tone and the guard tone do not actually transmit energy. As shown in FIG. 4 and FIG. 5, guard tones are separately located on a leftmost side and a rightmost side of an entire bandwidth, DC tones are located in the center of the entire bandwidth, and tones are basically distributed in a centrosymmetric mode.

It may be understood that, for a 10-MHz PPDU, a first part of fields of the PPDU occupy a 10-MHz frequency-domain resource. The 10-MHz frequency-domain resource includes 64 tones, and a tone spacing is 156.25 kHz. A specific division manner of the 64 tones may be a tone distribution manner of 802.11p, or another manner may be used. This is not limited in this embodiment of this application. A 128-tone distribution shown in FIG. 4 or FIG. 5 may be used for a second part of fields.

Figure 6:
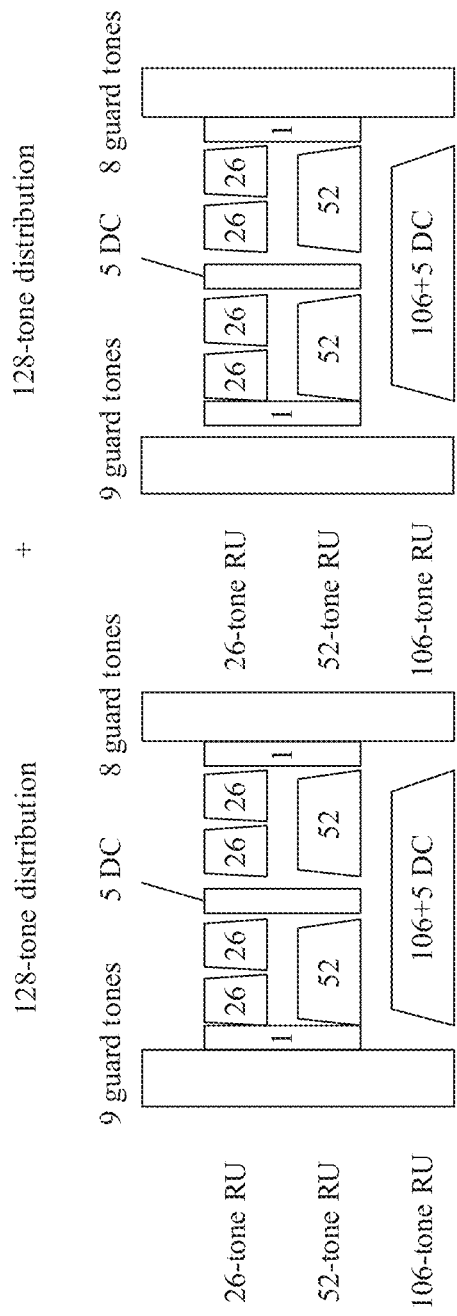
FIG. 6 is an example distribution diagram of tones on 10 MHz+10 MHz according to an embodiment of this application.

For a 20-MHz PPDU, the tone distribution manner of 802.11p may be used for a first part of fields of the PPDU on each of two 10-MHz bandwidths, or another manner may be used. This is not limited in this embodiment of this application. In addition, a replication mode is used for tone distributions of the first part of fields on the two 10-MHz bandwidths, that is, the tone distributions of the first part of fields on the two 10-MHz bandwidths are the same. Two of the 10-MHz tone distributions shown in FIG. 4 or FIG. 5 may be used for a second part of fields. For example, FIG. 6 is an example distribution diagram of tones on 10 MHz+10 MHz according to an embodiment of this application. As shown in FIG. 6, the 10-MHz tone distribution shown in FIG. 5 is used for the second part of fields on the two 10-MHz bandwidths. Tones distributed on the two 10-MHz bandwidths are used to jointly transmit one service, or may be used to separately transmit different services.

Figure 7:
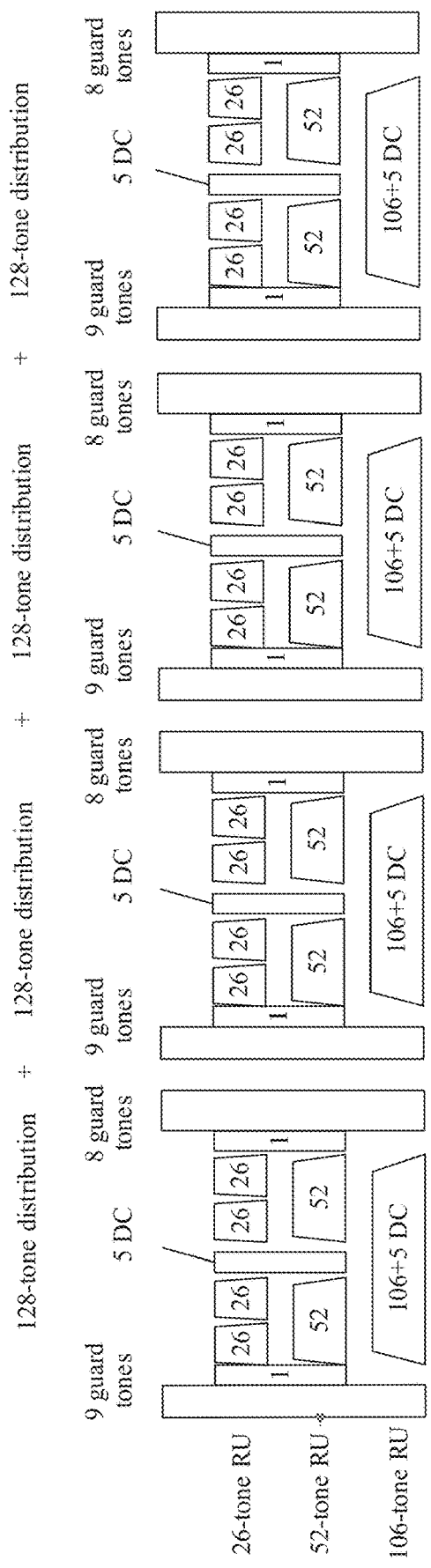
FIG. 7 is an example distribution diagram of tones on 10 MHz+10 MHz+10 MHz+10 MHz according to an embodiment of this application.

For a 40-MHz PPDU, the tone distribution manner of 802.11p may be used for a first part of fields of the PPDU on four 10-MHz bandwidths, or another manner may be used. This is not limited in this embodiment of this application. In addition, a replication mode is used for the first part of fields on the four 10-MHz bandwidths, that is, tone distributions of the first part of fields on the four 10-MHz bandwidths are the same. Four of the 10-MHz tone distributions shown in FIG. 4 or FIG. 5 may be used for a second part of fields. For example, FIG. 7 is an example distribution diagram of tones on 10 MHz+10 MHz+10 MHz+10 MHz according to an embodiment of this application. As shown in FIG. 7, the 10-MHz tone distribution shown in FIG. 5 is used for the second part of fields on the four 10-MHz bandwidths. Tones distributed on the four 10-MHz bandwidths are used to jointly transmit one service, or may be used to separately transmit different services.

For a 60-MHz PPDU, the tone distribution manner of 802.11p may be used for a first part of fields of the PPDU on six 10-MHz bandwidths, or another manner may be used. This is not limited in this embodiment of this application. In addition, a replication mode is used for the first part of fields on the six 10-MHz bandwidths. Six of the 10-MHz tone distributions shown in FIG. 4 or FIG. 5 may be used for a second part of fields. For example, the 10-MHz tone distribution shown in FIG. 4 is used for the second part of fields on the six 10-MHz bandwidths. Tones distributed on the six 10-MHz bandwidths are used to jointly transmit one service, or may be used to separately transmit different services.

In an embodiment, a transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. A quantity of tones per 10-MHz tone distribution corresponding to the second part of fields is 128, and a tone spacing is 78.125 kHz. First, because the data transmission method provided in this application is applicable to 10 MHz, 20 MHz, 40 MHz, 60 MHz, and the like, a transmission bandwidth is increased compared with that of 802.11p, and therefore a system throughput is increased. Second, this application provides the tone distribution manner shown in FIG. 4. As shown in FIG. 4, the transmit end may transmit data by using some RUs to increase a data transmission distance, or may simultaneously transmit data of different services by using a plurality of RUs to improve data transmission efficiency.

Embodiment 2

Figure 8:
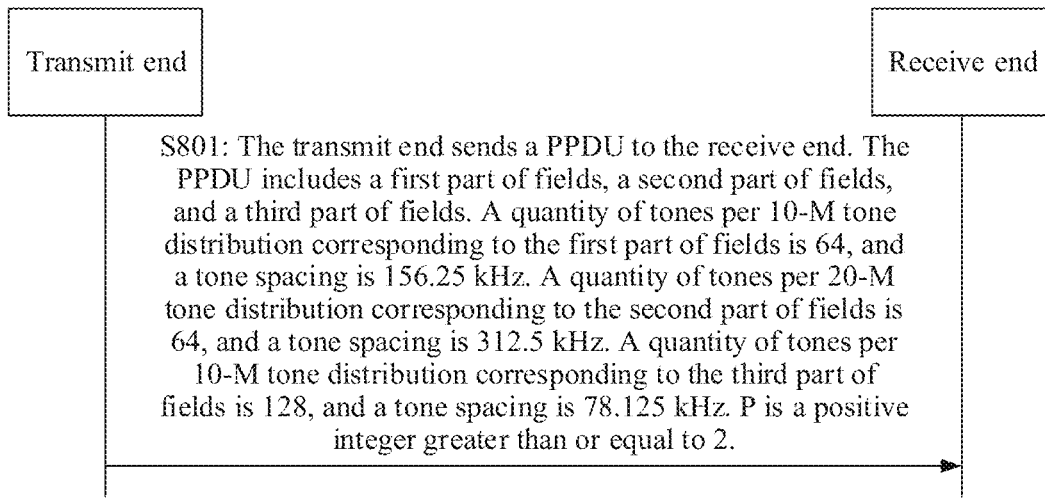
FIG. 8 is a flowchart of a data transmission method according to an embodiment of this application.

FIG. 8 is a flowchart of a data transmission method according to an embodiment of this application. As shown in FIG. 8, the method includes the following operations:

Operation S801: A transmit end sends a PPDU to a receive end. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones per 10-MHz tone distribution corresponding to the third part of fields is 128, and a tone spacing is 78.125 kHz. P is a positive integer greater than or equal to 2.

In an embodiment, a quantity of tones in a tone distribution per 10-MHz frequency-domain resource corresponding to the third part of fields is 128, and a tone spacing is 78.125 kHz. As shown in FIG. 4, each 10-MHz tone distribution corresponding to the third part of fields includes M1 26-tone RUs, M2 52-tone RUs, M3 106-tone RUs, M4 guard tones, M5 null tones, and M6 DC tones. M1×26+M2×52+M3×106+M4+M5+M6=128. M1, M2, M3, M4, M5, and M6 are integers greater than or equal to 0.

In an embodiment, M1=4, M2=0, M3=0, and M4+M5+M6=24. M41 guard tones and M42 guard tones are provided on two sides of the four 26-tone RUs, and M41+M42=M4.

Alternatively, M1=0, M2=2, M3=0, and M4+M5+M6=24. M43 guard tones and M44 guard tones are provided on two sides of the two 52-tone RUs, and M43+M44=M4.

Alternatively, M1=0, M2=0, M3=1, and M4+M5+M6=22. M45 guard tones and M46 guard tones are provided on two sides of the two 52-tone RUs, and M45+M46=M4.

Alternatively, M1=2, M2=1, M3=0, and M4+M5+M6=24. M47 guard tones and M48 guard tones are provided on two sides of the two 26-tone RUs and the one 52-tone RU, and M47+M48=M4.

In other words, guard tones are distributed on two sides of a 26-tone RU, a 52-tone RU, or a 106-tone RU.

For example, as shown in FIG. 5, M1=4, M2=0, M3=0, M41=9, M42=8, M5=2, and M6=5; or M1=0, M2=2, M3=0, M43=9, M44=8, M5=2, and M6=5; or M1=0, M2=0, M3=1, M45=9, M46=8, M5=0, and M6=5. One 106-tone RU may include 102 data tones and four pilot tones. As shown in FIG. 8A, guard tones are evenly distributed on two sides of a 26-tone RU, a 52-tone RU, or a 106-tone RU. Null tones may be alternatively located between RUs or on two sides of a DC tone. This is not limited in this application.

In a 10-MHz frequency-domain resource, index numbers of 128 tones are [−64, 63].

When M41=9 and M42=8, in an example, M41 guard tones may fall within [−64, −56], and M42 guard tones may fall within [56, 63]; in another example, M41 guard tones may fall within [56, 63], and M42 guard tones may fall within [−64, −56].

When M43=9 and M44=8, in an example, M43 guard tones may fall within [−64, −56], and M44 guard tones may fall within [56, 63]; in another example, M43 guard tones may fall within [56, 63], and M44 guard tones may fall within [−64, −56].

When M45=9 and M46=8, in an example, M45 guard tones may fall within [−64, −56], and M46 guard tones may fall within [56, 63]; in another example, M45 guard tones may fall within [56, 63], and M46 guard tones may fall within [−64, −56].

When M47=9 and M48=8, in an example, M47 guard tones fall within [−64, −56], and M48 guard tones fall within [56, 63]; in another example, M47 guard tones fall within [56, 63], and M48 guard tones fall within [−64, −56].

It should be noted that a guard tone is mainly used to prevent out-of-band interference, a DC tone is mainly used to prevent DC component interference and the like, and the DC tone and the guard tone do not actually transmit energy. As shown in FIG. 4 and FIG. 5, guard tones are separately located on a leftmost side and a rightmost side of an entire bandwidth, DC tones are located in the center of the entire bandwidth, and tones are basically distributed in a centrosymmetric mode.

It may be understood that, for a 10-MHz PPDU, a first part of fields of the PPDU occupy a 10-MHz frequency-domain resource. The 10-MHz frequency-domain resource includes 64 tones, and a tone spacing is 156.25 kHz. A specific division manner of the 64 tones may be a tone distribution manner of 802.11p, or another manner may be used. This is not limited in this embodiment of this application. A quantity of tones per 20-MHz tone distribution corresponding to a second part of fields is 64, and a tone spacing is 312.5 kHz. A 128-tone distribution shown in FIG. 4 or FIG. 5 may be used for a third part of fields.

For a 20-MHz PPDU, the tone distribution manner of 802.11p is used for a first part of fields of the PPDU on two 10-MHz bandwidths, or another manner may be used. This is not limited in this embodiment of this application. In addition, a replication mode is used for tone distributions of the first part of fields on the two 10-MHz bandwidths. The tone distributions of the first part of fields on the two 10-MHz bandwidths are the same. A quantity of tones per 20-MHz tone distribution corresponding to a second part of fields is 64, and a tone spacing is 312.5 kHz. Two of the 10-MHz tone distributions shown in FIG. 4 or FIG. 5 may be used for a third part of fields. For example, as shown in FIG. 6, the 10-MHz tone distribution shown in FIG. 5 is used for the third part of fields on the two 10-MHz bandwidths. Tones distributed on the two 10-MHz bandwidths are used to jointly transmit one service, or may be used to separately transmit different services.

For a 40-MHz PPDU, the tone distribution manner of 802.11p is used for a first part of fields of the PPDU on four 10-MHz bandwidths, or another manner may be used. This is not limited in this embodiment of this application. In addition, a replication mode is used for the first part of fields on the four 10-MHz bandwidths, that is, tone distributions of the first part of fields on the four 10-MHz bandwidths are the same. A quantity of tones per 20-MHz tone distribution corresponding to a second part of fields is 64, and a tone spacing is 312.5 kHz. Four of the 10-MHz tone distributions shown in FIG. 4 or FIG. 5 may be used for a third part of fields. For example, as shown in FIG. 7, the 10-MHz tone distribution shown in FIG. 5 is used for the third part of fields on the four 10-MHz bandwidths. Tones distributed on the four 10-MHz bandwidths are used to jointly transmit one service, or may be used to separately transmit different services.

For a 60-MHz PPDU, the tone distribution manner of 802.11p is used for a first part of fields of the PPDU on six 10-MHz bandwidths, or another manner may be used. This is not limited in this embodiment of this application. In addition, a replication mode is used for the first part of fields on the six 10-MHz bandwidths. A quantity of tones per 20-MHz tone distribution corresponding to a second part of fields is 64, and a tone spacing is 312.5 kHz. Six of the 10-MHz tone distributions shown in FIG. 4 or FIG. 5 may be used for a third part of fields. For example, the 10-MHz tone distribution shown in FIG. 5 is used for the third part of fields on the six 10-MHz bandwidths. Tones distributed on the six 10-MHz bandwidths are used to jointly transmit one service, or may be used to separately transmit different services.

In an embodiment, a transmit end sends a PPDU to a receive end. A bandwidth of the PPDU is P×10 MHz. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones per 10-MHz tone distribution corresponding to the third part of fields is 128, and a tone spacing is 78.125 kHz. First, because the data transmission method provided in this application is applicable to 10 MHz, 20 MHz, 40 MHz, 60 MHz, and the like, a transmission bandwidth is increased compared with that of 802.11p, and therefore a system throughput is increased. Second, this application provides the tone distribution manner shown in FIG. 4. As shown in FIG. 4, the transmit end may transmit data by using some RUs to increase a data transmission distance, or may simultaneously transmit data of different services by using a plurality of RUs to improve data transmission efficiency.

Embodiment 3

Figure 9:
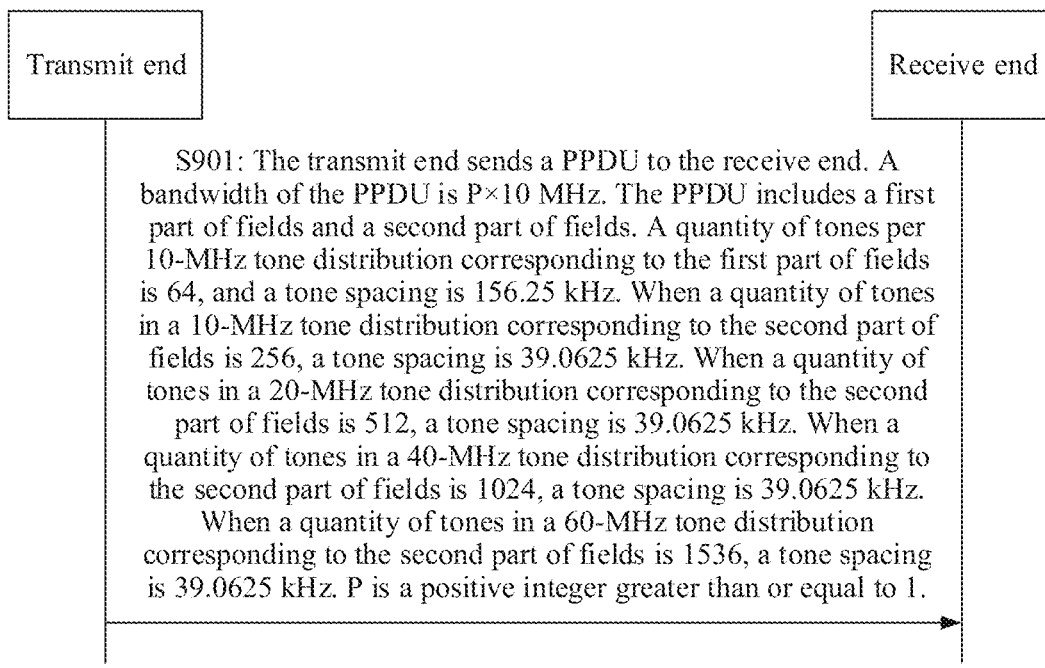
FIG. 9 is a flowchart of a data transmission method according to an embodiment of this application.

FIG. 9 is a flowchart of a data transmission method according to an embodiment of this application. As shown in FIG. 9, the method includes the following operations:

Operation S901: A transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. When a quantity of tones in a 10-MHz tone distribution corresponding to the second part of fields is 256, a tone spacing is 39.0625 kHz. When a quantity of tones in a 20-MHz tone distribution corresponding to the second part of fields is 512, a tone spacing is 39.0625 kHz. When a quantity of tones in a 40-MHz tone distribution corresponding to the second part of fields is 1024, a tone spacing is 39.0625 kHz. When a quantity of tones in a 60-MHz tone distribution corresponding to the second part of fields is 1536, a tone spacing is 39.0625 kHz. P is a positive integer greater than or equal to 1.

For a 10-MHz PPDU, a first part of fields of the PPDU occupy a 10-MHz frequency-domain resource. The 10-MHz frequency-domain resource includes 64 tones, and a tone spacing is 156.25 kHz. A specific division manner of the 64 tones may be a tone distribution manner of 802.11p, or another manner may be used. This is not limited in this embodiment of this application.

In an embodiment, a transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. When a quantity of tones in a 10-MHz tone distribution corresponding to the second part of fields is 256, a tone spacing is 39.0625 kHz. When a quantity of tones in a 20-MHz tone distribution corresponding to the second part of fields is 512, a tone spacing is 39.0625 kHz. When a quantity of tones in a 40-MHz tone distribution corresponding to the second part of fields is 1024, a tone spacing is 39.0625 kHz. When a quantity of tones in a 60-MHz tone distribution corresponding to the second part of fields is 1536, a tone spacing is 39.0625 kHz. Because the data transmission method provided in this application is applicable to 10 MHz, 20 MHz, 40 MHz, 60 MHz, and the like, a transmission bandwidth is increased compared with that of 802.11p, and therefore a system throughput is increased. In addition, because a tone spacing of each bandwidth is comparatively smaller and a symbol length is longer, a capability of resisting intercode crosstalk is stronger.

Embodiment 4

Figure 10:
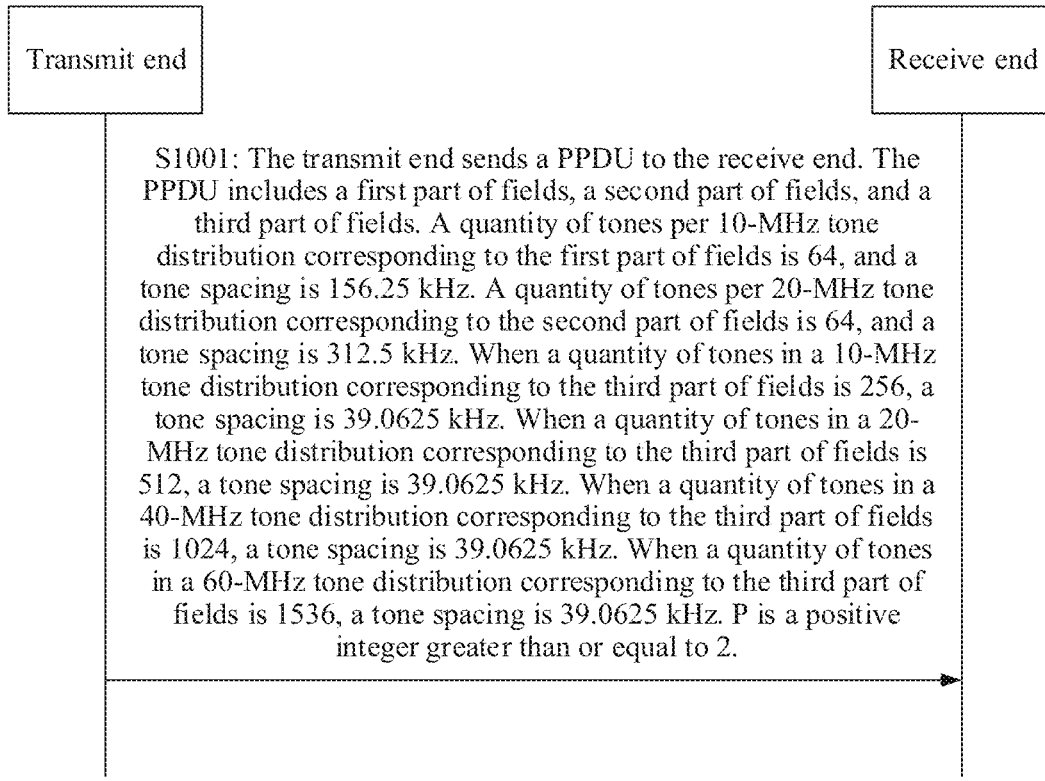
FIG. 10 is a flowchart of a data transmission method according to an embodiment of this application.

FIG. 10 is a flowchart of a data transmission method according to an embodiment of this application. As shown in FIG. 10, the method includes the following operations:

Operation S1001: A transmit end sends a PPDU to a receive end. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. When a quantity of tones in a 10-MHz tone distribution corresponding to the third part of fields is 256, a tone spacing is 39.0625 kHz. When a quantity of tones in a 20-MHz tone distribution corresponding to the third part of fields is 512, a tone spacing is 39.0625 kHz. When a quantity of tones in a 40-MHz tone distribution corresponding to the third part of fields is 1024, a tone spacing is 39.0625 kHz. When a quantity of tones in a 60-MHz tone distribution corresponding to the third part of fields is 1536, a tone spacing is 39.0625 kHz. P is a positive integer greater than or equal to 2.

For a 10-MHz PPDU, a first part of fields of the PPDU occupy a 10-MHz frequency-domain resource. The 10-MHz frequency-domain resource includes 64 tones, and a tone spacing is 156.25 kHz. A specific division manner of the 64 tones may be a tone distribution manner of 802.11p, or another manner may be used. This is not limited in this embodiment of this application.

In an embodiment, a transmit end sends a PPDU to a receive end. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. When a quantity of tones in a 10-MHz tone distribution corresponding to the third part of fields is 256, a tone spacing is 39.0625 kHz. When a quantity of tones in a 20-MHz tone distribution corresponding to the third part of fields is 512, a tone spacing is 39.0625 kHz. When a quantity of tones in a 40-MHz tone distribution corresponding to the third part of fields is 1024, a tone spacing is 39.0625 kHz. When a quantity of tones in a 60-MHz tone distribution corresponding to the third part of fields is 1536, a tone spacing is 39.0625 kHz. Because the data transmission method provided in this application is applicable to 10 MHz, 20 MHz, 40 MHz, 60 MHz, and the like, a transmission bandwidth is increased compared with that of 802.11p, and therefore a system throughput is increased.

Embodiment 5

Figure 11:
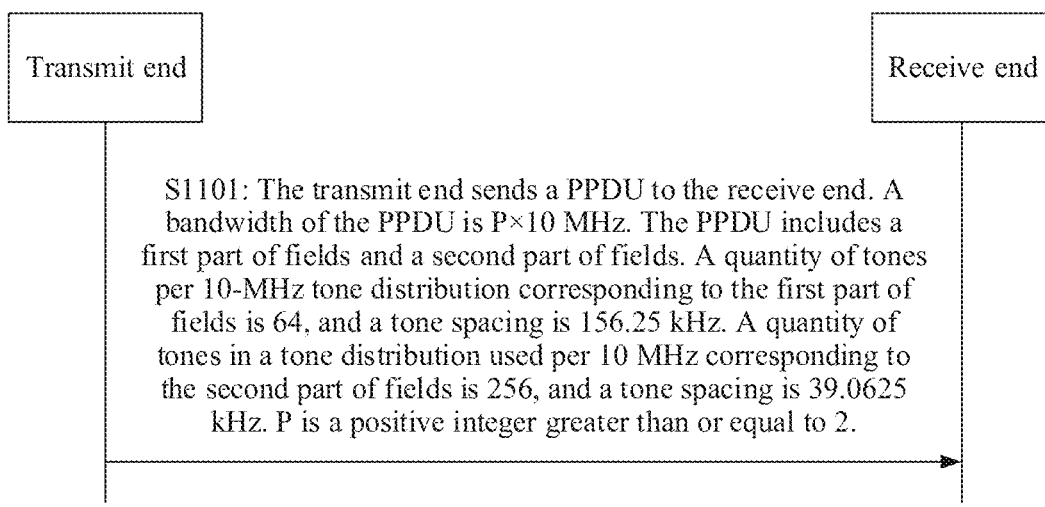
FIG. 11 is a flowchart of a data transmission method according to an embodiment of this application.

FIG. 11 is a flowchart of a data transmission method according to an embodiment of this application. As shown in FIG. 11, the method includes the following operations:

Operation S1101: A transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. A quantity of tones in a tone distribution used per 10 MHz corresponding to the second part of fields is 256, and a tone spacing is 39.0625 kHz. P is a positive integer greater than or equal to 2.

Each 10-MHz frequency-domain resource corresponding to the first part of fields includes 64 tones, and a tone spacing is 156.25 kHz. A specific division manner of the 64 tones may be a tone distribution manner of 802.11p, or another manner may be used. This is not limited in this embodiment of this application.

It should be noted that, when P=2, the second part of fields correspond to a 10-MHz+10-MHz tone distribution manner, which is similar to the case in FIG. 6. A difference from FIG. 6 lies in that, in this embodiment, the quantity of tones in the tone distribution used per 10 MHz corresponding to the second part of fields is 256, and the tone spacing is 39.0625 kHz. Likewise, when P=4, the second part of fields correspond to a 10-MHz+10-MHz+10-MHz+10-MHz tone distribution manner, which is similar to the case in FIG. 7. A difference from FIG. 7 lies in that, in this embodiment, the quantity of tones in the tone distribution used per 10 MHz corresponding to the second part of fields is 256, and the tone spacing is 39.0625 kHz.

In an embodiment, a transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. A quantity of tones in a tone distribution used per 10 MHz corresponding to the second part of fields is 256, and a tone spacing is 39.0625 kHz. Because the data transmission method provided in this application is applicable to 10 MHz, 20 MHz, 40 MHz, 60 MHz, and the like, a transmission bandwidth is increased compared with that of 802.11p, and therefore a system throughput is increased.

Embodiment 6

Figure 12:
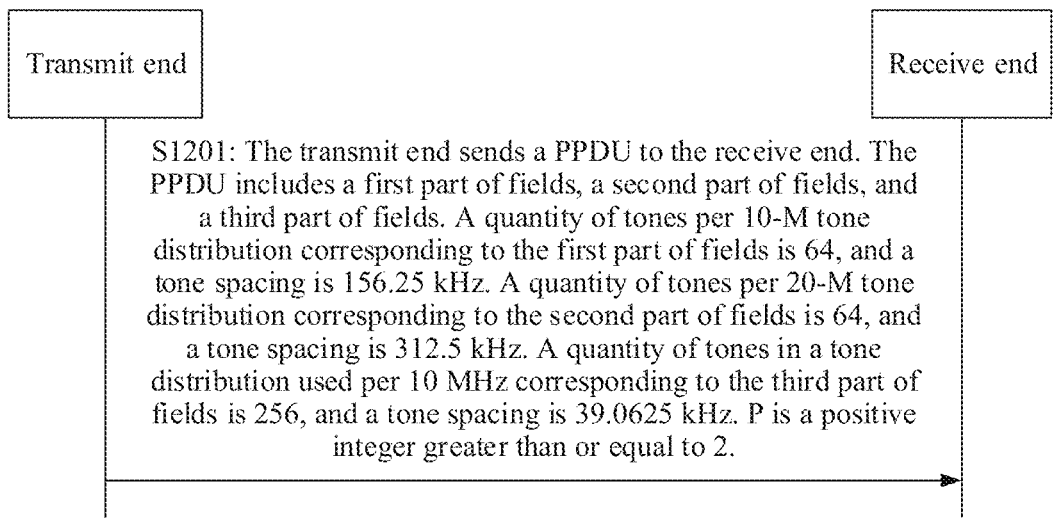
FIG. 12 is a flowchart of a data transmission method according to an embodiment of this application.

FIG. 12 is a flowchart of a data transmission method according to an embodiment of this application. As shown in FIG. 12, the method includes the following operations:

Operation S1201: A transmit end sends a PPDU to a receive end. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones in a tone distribution used per 10 MHz corresponding to the third part of fields is 256, and a tone spacing is 39.0625 kHz. P is a positive integer greater than or equal to 2.

Each 10-MHz frequency-domain resource corresponding to the first part of fields includes 64 tones, and a tone spacing is 156.25 kHz. A specific division manner of the 64 tones may be a tone distribution manner of 802.11p, or another manner may be used. This is not limited in this embodiment of this application.

It should be noted that, when P=2, the third part of fields correspond to a 10-MHz+10-MHz tone distribution manner, which is similar to the case in FIG. 6. A difference from FIG. 6 lies in that, in this embodiment, the quantity of tones in the tone distribution used per 10 MHz corresponding to the third part of fields is 256, and the tone spacing is 39.0625 kHz. Likewise, when P=4, the third part of fields correspond to a 10-MHz+10-MHz+10-MHz+10-MHz tone distribution manner, which is similar to the case in FIG. 7. A difference from FIG. 7 lies in that, in this embodiment, the quantity of tones in the tone distribution used per 10 MHz corresponding to the third part of fields is 256, and the tone spacing is 39.0625 kHz.

In an embodiment, a transmit end sends a PPDU to a receive end. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones in a tone distribution used per 10 MHz corresponding to the third part of fields is 256, and a tone spacing is 39.0625 kHz. Because the data transmission method provided in this application is applicable to 10 MHz, 20 MHz, 40 MHz, 60 MHz, and the like, a transmission bandwidth is increased compared with that of 802.11p, and therefore a system throughput is increased.

Embodiment 7

Figure 13:
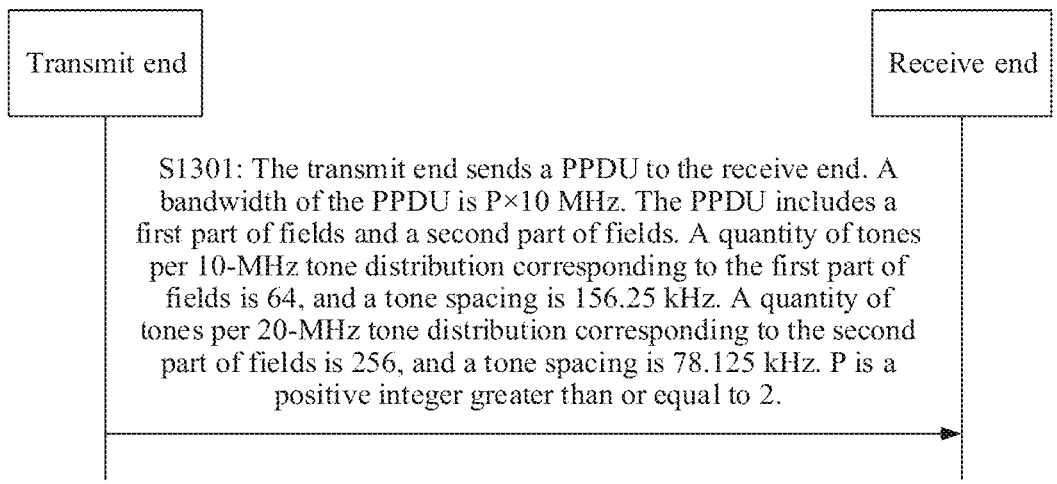
FIG. 13 is a flowchart of a data transmission method according to an embodiment of this application.

FIG. 13 is a flowchart of a data transmission method according to an embodiment of this application. As shown in FIG. 13, the method includes the following operations:

Operation S1301: A transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. A quantity of tones per 20-MHz tone distribution corresponding to the second part of fields is 256, and a tone spacing is 78.125 kHz. P is a positive integer greater than or equal to 2.

Each 10-MHz frequency-domain resource corresponding to the first part of fields includes 64 tones, and a tone spacing is 156.25 kHz. A specific division manner of the 64 tones may be a tone distribution manner of 802.11p, or another manner may be used. This is not limited in this embodiment of this application.

In an embodiment, a tone distribution manner of a 20-MHz PPDU is used per 20 MHz corresponding to the second part of fields, and each 20-MHz tone distribution includes M1 26-tone RUs, M2 52-tone RUs, M3 106-tone RUs, M4 guard tones, M5 null tones, M6 DC tones, and M7 242-tone RUs. $M1 \times 26 + M2 \times 52 + M3 \times 106 + M4 + M5 + M6 + M7 \times 242 = 256$. M1, M2, M3, M4, M5, M6, and M7 are integers greater than or equal to 0.

Figure 14:
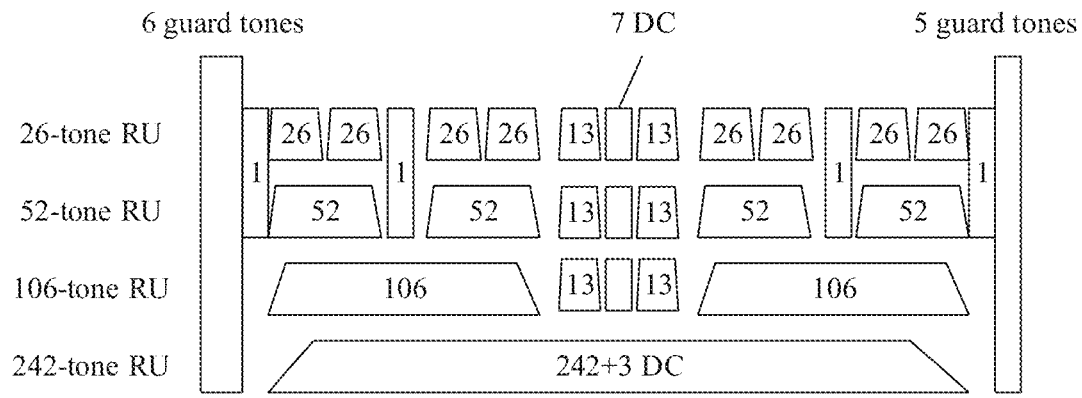
FIG. 14 is a schematic distribution diagram of 256 tones on 20 MHz according to an embodiment of this application.

In an embodiment, FIG. 14 is a schematic distribution diagram of 256 tones on 20 MHz according to an embodiment of this application. As shown in FIG. 14, a 20-MHz bandwidth may include nine 26-tone RUs (a 26-tone RU in the middle includes two discontinuous groups of tones separated by DC tones, where the two groups of tones each include 13 tones and may be understood as two virtual 13-tone RUs, but actually, the 13-tone RUs do not exist), 11 guard tones, seven direct current (DC) tones, and four null tones. In FIG. 14, 26 indicates a 26-tone RU; two 13s indicate the two virtual 13-tone RUs, which form the 26-tone RU in the middle; and six guard tones and five guard tones are separately included on two sides of the nine 26-tone RUs. In FIG. 14, 1 indicates a null tone.

Alternatively, as shown in FIG. 14, a 20-MHz bandwidth may include four 52-tone RUs, a 26-tone RU in the middle (the 26-tone RU in the middle includes two discontinuous groups of tones separated by DC tones, where the two groups of tones each include 13 tones and may be understood as two virtual 13-tone RUs, but actually, the 13-tone RUs do not exist), 11 guard tones (Guard tone), four null tones, and seven DC tones. In FIG. 14, 52 indicates a 52-tone RU, and six guard tones and five guard tones are separately included on two sides of the four 52-tone RUs.

Alternatively, as shown in FIG. 14, a 20-MHz bandwidth may include two 106-tone RUs, a 26-tone RU in the middle (the 26-tone RU in the middle includes two discontinuous groups of tones separated by DC tones, where the two groups of tones each include 13 tones and may be understood as two virtual 13-tone RUs, but actually, the 13-tone RUs do not exist), 11 guard tones, four null tones, and seven DC tones. In FIG. 14, 106 indicates a 106-tone RU, and six guard tones and five guard tones are separately included on two sides of the two 106-tone RUs.

Alternatively, as shown in FIG. 14, a 20-MHz bandwidth may include one 242-tone RU, 11 guard tones, and three DC tones. In FIG. 14, 242 indicates a 242-tone RU, and six guard tones and five guard tones are separately included on two sides of the 242-tone RU.

Alternatively, a 20-MHz bandwidth may include three 26-tone RUs (a 26-tone RU in the middle includes two discontinuous groups of tones separated by DC tones, where the two groups of tones each include 13 tones and may be understood as two virtual 13-tone RUs, but actually, the 13-tone RUs do not exist), one 52-tone RU, one 106-tone RU, 11 guard tones (Guard tone), two null tones, and seven DC tones.

As shown in FIG. 14, guard tones are separately located on a leftmost side and a rightmost side of an entire bandwidth, DC tones are located in the center of the entire bandwidth, and tones are basically distributed in a centrosymmetric mode.

It should be noted that a distribution manner of 256 tones on 20 MHz is not limited to the manner shown in FIG. 14.

In an embodiment, a transmit end sends a PPDU to a receive end. A bandwidth of the PPDU is P×10 MHz. The PPDU includes a first part of fields and a second part of fields. A quantity of tones per 10-MHz tone distribution corresponding to the first part of fields is 64, and a tone spacing is 156.25 kHz. A quantity of tones per 20-MHz tone distribution corresponding to the second part of fields is 256, and a tone spacing is 78.125 kHz. P is a positive integer greater than or equal to 2. Because the data transmission method provided in this application is applicable to 10 MHz, 20 MHz, 40 MHz, 60 MHz, and the like, a transmission bandwidth is increased compared with that of 802.11p, and therefore a system throughput is increased.

Embodiment 8

Figure 15:
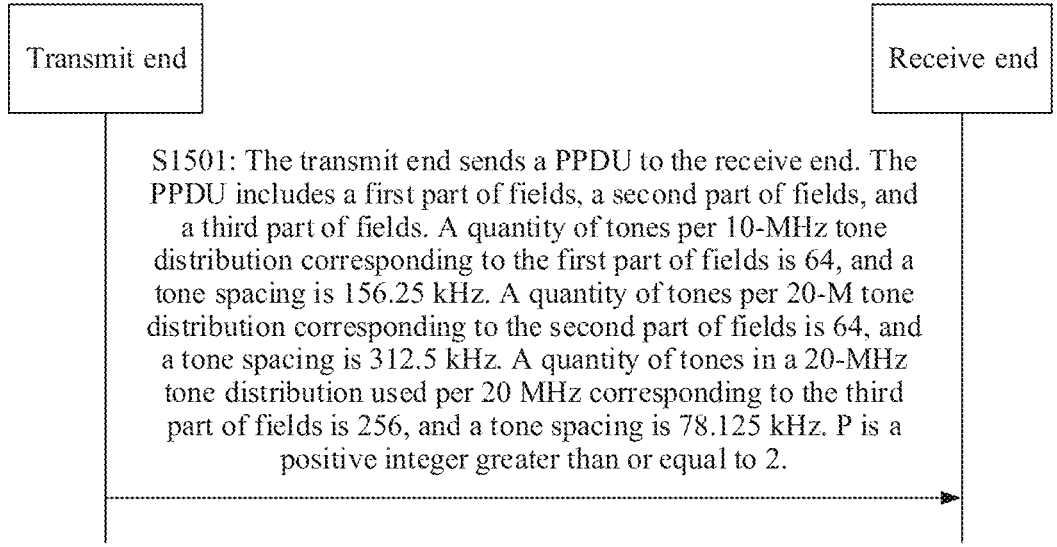
FIG. 15 is a flowchart of a data transmission method according to an embodiment of this application.

FIG. 15 is a flowchart of a data transmission method according to an embodiment of this application. As shown in FIG. 15, the method includes the following operations:

Operation S1501: A transmit end sends a PPDU to a receive end. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones in a tone distribution used per 20 MHz corresponding to the third part of fields is 256, and a tone spacing is 78.125 kHz. P is a positive integer greater than or equal to 2.

Each 10-MHz frequency-domain resource corresponding to the first part of fields includes 64 tones, and a tone spacing is 156.25 kHz. A specific division manner of the 64 tones may be a tone distribution manner of 802.11p, or another manner may be used. This is not limited in this embodiment of this application.

In an embodiment, a tone distribution manner of a 20-MHz PPDU is used per 20 MHz corresponding to the third part of fields. Each 20-MHz tone distribution includes M1 26-tone RUs, M2 52-tone RUs, M3 106-tone RUs, M4 guard tones, M5 null tones, M6 DC tones, and M7 242-tone RUs. M1×26+M2×52+M3×106+M4+M5+M6+M7×242=256. M1, M2, M3, M4, M5, M6, and M7 are integers greater than or equal to 0.

In an embodiment, as shown in FIG. 14, a 20-MHz bandwidth may include nine 26-tone RUs (a 26-tone RU in the middle includes two discontinuous groups of tones separated by DC tones, where the two groups of tones each include 13 tones and may be understood as two virtual 13-tone RUs, but actually, the 13-tone RUs do not exist), 11 guard tones, seven direct current (DC) tones (tone), and four null tones. In FIG. 14, 26 indicates a 26-tone RU; two 13s indicate the two virtual 13-tone RUs, which form the 26-tone RU in the middle; and six guard tones and five guard tones are separately included on two sides of the nine 26-tone RUs. In FIG. 14, 1 indicates a null tone.

Alternatively, as shown in FIG. 14, a 20-MHz bandwidth may include four 52-tone RUs, a 26-tone RU in the middle (the 26-tone RU in the middle includes two discontinuous groups of tones separated by DC tones, where the two groups of tones each include 13 tones and may be understood as two virtual 13-tone RUs, but actually, the 13-tone RUs do not exist), 11 guard tones (Guard tone), four null tones, and seven DC tones. In FIG. 14, 52 indicates a 52-tone RU, and six guard tones and five guard tones are separately included on two sides of the four 52-tone RUs.

Alternatively, as shown in FIG. 14, a 20-MHz bandwidth may include two 106-tone RUs, a 26-tone RU in the middle (the 26-tone RU in the middle includes two discontinuous groups of tones separated by DC tones, where the two groups of tones each include 13 tones and may be understood as two virtual 13-tone RUs, but actually, the 13-tone RUs do not exist), 11 guard tones, four null tones, and seven DC tones. In FIG. 14, 106 indicates a 106-tone RU, and six guard tones and five guard tones are separately included on two sides of the two 106-tone RUs.

Alternatively, as shown in FIG. 14, a 20-MHz bandwidth may include one 242-tone RU, 11 guard tones, and three DC tones. In FIG. 14, 242 indicates a 242-tone RU, and six guard tones and five guard tones are separately included on two sides of the 242-tone RU.

Alternatively, a 20-MHz bandwidth may include three 26-tone RUs (a 26-tone RU in the middle includes two discontinuous groups of tones separated by DC tones, where the two groups of tones each include 13 tones and may be understood as two virtual 13-tone RUs, but actually, the 13-tone RUs do not exist), one 52-tone RU, one 106-tone RU, 11 guard tones (Guard tone), two null tones, and seven DC tones.

In an embodiment, a transmit end sends a PPDU to a receive end. The PPDU includes a first part of fields, a second part of fields, and a third part of fields. A quantity of tones per 10-MHz tone distribution corresponding to the first part of fields is 64, and a tone spacing is 156.25 kHz. A quantity of tones per 20-MHz tone distribution corresponding to the second part of fields is 64, and a tone spacing is 312.5 kHz. A quantity of tones in a 20-MHz tone distribution used per 20 MHz corresponding to the third part of fields is 64, and a tone spacing is 312.5 kHz. Because the data transmission method provided in this application is applicable to 10 MHz, 20 MHz, 40 MHz, 60 MHz, and the like, a transmission bandwidth is increased compared with that of 802.11p, and therefore a system throughput is increased.

Embodiment 9

Based on Embodiment 1, Embodiment 3, Embodiment 5, and Embodiment 7, a first part of the fields and a second part of the fields each may include the following content.

Figure 16:
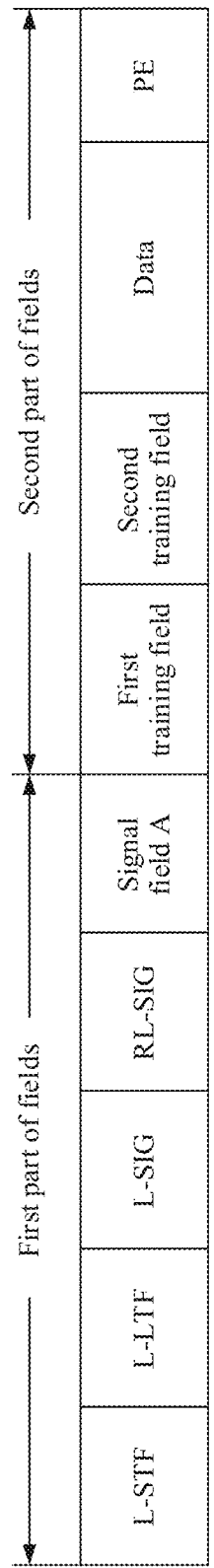
FIG. 16 is a schematic diagram of a PPDU according to an embodiment of this application.

Case 1: FIG. 16 is a schematic diagram of a PPDU according to an embodiment of this application. As shown in FIG. 16, a first part of fields may include but are not limited to at least one of the following: a legacy-short training field (L-STF), a legacy-long training field (L-LTF), a legacy-signal field (L-SIG), a repeated legacy-signal field (RL-SIG), and a signal field A. A second part of fields may include but are not limited to at least one of the following: a first training field, a second training field, data field, and a packet extension (PE) field.

The L-STF is used for data packet detection, coarse frequency and time synchronization, and AGC.

The L-LTF is used for channel estimation and fine frequency and time synchronization.

The L-SIG includes related signaling information, and is used to indicate a length and a rate of the data field.

The RL-SIG is used for automatic detection and L-SIG robustness enhancement.

The signal field A includes signaling information used for parsing a data packet. The signaling information may include information such as a modulation and coding scheme (MCS), a dual carrier modulation (DCM) indication, spatial reuse (SR) indication, and a bandwidth indication. For ease of description, the signal field is referred to as a next generation V2X-efficient signal field-A (NGV-SIG-A) in this embodiment of this application. It may be understood that the signal field may alternatively have another name. This is not limited in this embodiment of this application.

The first training field is used for AGC and the like of the second part of fields. For ease of description, the first training field is referred to as a next generation V2X-efficient short training field (NGV-STF) in this embodiment of this application. It may be understood that the signal field may alternatively have another name. This is not limited in this embodiment of this application.

The second training field is used for channel measurement of the second part of fields. For ease of description, the second training field is referred to as a next generation V2X-efficient long training field (NGV-LTF) in this embodiment of this application. It may be understood that the signal field may alternatively have another name. This is not limited in this embodiment of this application.

The data field is used to carry a medium access control (MAC) frame.

The PE field is used to help a receive end obtain more processing time.

Figure 17:
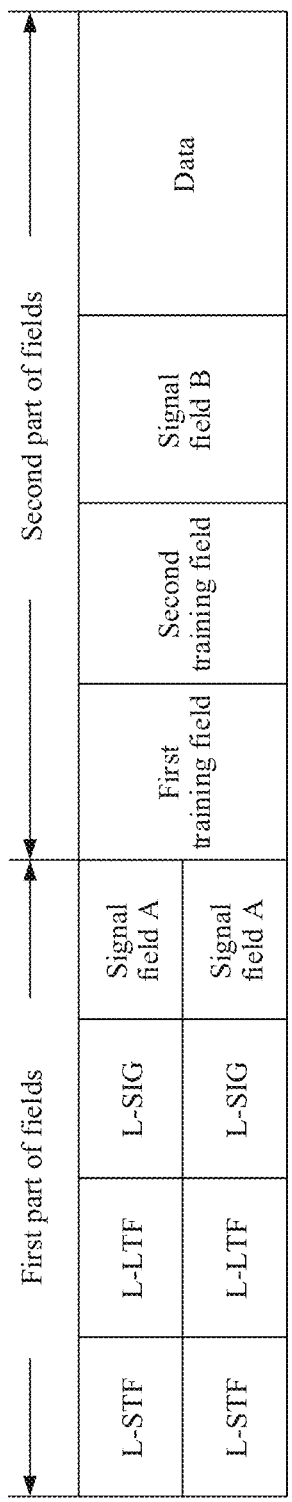
FIG. 17 is a schematic diagram of a 20-MHz PPDU according to an embodiment of this application.

Case 2: FIG. 17 is a schematic diagram of a 20-MHz PPDU according to an embodiment of this application. As shown in FIG. 17, a first part of fields in the 20-MHz PPDU may include but are not limited to at least one of the following: an L-STF, an L-LTF, an L-SIG, and a signal field A. A second part of fields may include but are not limited to at least one of the following: a first training field, a second training field, a signal field B, and data (Data) field.

Meanings represented by the L-STF, the L-LTF, the L-SIG, the RL-SIG, and the signal field A are the same as the meanings represented by the corresponding fields in the case 1. Details are not described again in this application. Meanings represented by the first training field, the second training field, and the data (Data) field are the same as the meanings represented by the corresponding fields in the case 1. Details are not described again in this application. In addition, the signal field B is used to indicate a length of the PPDU, but is not limited thereto. For ease of description, the signal field is referred to as a next generation V2X-efficient signal field-B (Next Generation V2X-Efficient Signal Field-B, NGV-SIG-B) in this embodiment of this application. It may be understood that the signal field may alternatively have another name. This is not limited in this embodiment of this application.

Figure 18A:
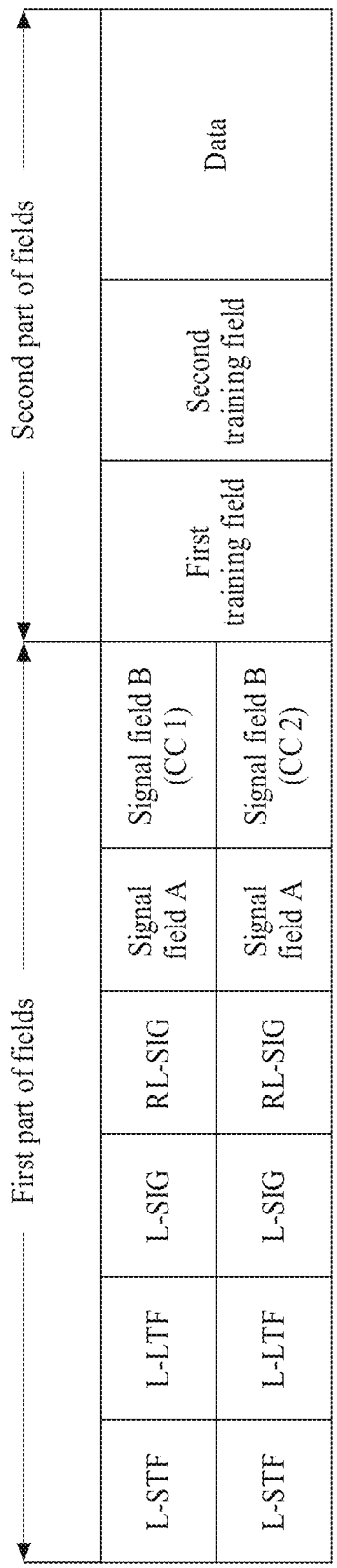
FIG. 18A is a schematic diagram of a PPDU according to an embodiment of this application.

Case 3: FIG. 18A is a schematic diagram of a PPDU according to an embodiment of this application. As shown in FIG. 18A, a first part of fields may include but are not limited to at least one of the following: an L-STF, an L-LTF, an L-SIG, an RL-SIG, a signal field A, and a signal field B. A second part of fields may include but are not limited to at least one of the following: a first training field, a second training field, and data field.

Meanings represented by the L-STF, the L-LTF, the L-SIG, the RL-SIG, and the signal field A are the same as the meanings represented by the corresponding fields in the case 1. Details are not described again in this application. Meanings represented by the first training field, the second training field, and the data field are the same as the meanings represented by the corresponding fields in the case 1. Details are not described again in this application.

When the PPDU is a multi-service data structure, that is, an AP sends a plurality of types of service data to a plurality of STAs, the signal field B may include resource indication information. The resource indication information may be used to indicate resource scheduling information corresponding to the plurality of types of service data. The signal field is referred to as a next generation V2X-efficient signal field-B (Next Generation V2X-Efficient Signal Field-B, NGV-SIG-B) in this embodiment of this application. It may be understood that the signal field may alternatively have another name. This is not limited in this embodiment of this application. The resource indication information may be used to indicate a resource unit allocation status on a 106-tone RU on 10 MHz corresponding to the signal field B.

For example, a replication mode may be used on each 10-MHz bandwidth for the NGV-SIG-B included in the first part of fields, that is, same content of the NGV-SIG-B is transmitted on each 10-MHz bandwidth. Alternatively, the NGV-SIG-B included in the first part of fields has different transmission content on each 10-MHz bandwidth, and 10-MHz bandwidths with different transmission content are referred to as content channels (CC). For example, as shown in FIG. 18A, transmission content of the NGV-SIG-B on each 10-MHz bandwidth is different.

It should be noted that, in the case 3, when a bandwidth of the PPDU is P×10 MHz and P is greater than or equal to 2, NGV-SIG-Bs on P 10-MHz bandwidths may be used to transmit M pieces of content, that is, there are M content channels. M is a positive integer greater than or equal to 1 and less than or equal to P.

In an example, FIG. 18B is a schematic structural diagram of a 40-MHz PPDU with two content channels. Resource indication information included in a signal field B (CC 1) on first 10 MHz is the same as that included in a signal field B (CC 1) on third 10 MHz, and may be used to indicate a resource unit allocation status on a 106-tone RU on the first 10 MHz, and is further used to indicate a resource unit allocation status on a 106-tone RU on the third 10 MHz. Resource indication information included in a signal field B (CC 1) on second 10 MHz is the same as that included in a signal field B (CC 1) on fourth 10 MHz, and may be used to indicate a resource unit allocation status on a 106-tone RU on the second 10 MHz, and is further used to indicate a resource unit allocation status on a 106-tone RU on the fourth 10 MHz. Fields other than the signal field B are not described herein again.

In another example, FIG. 18C is a schematic structural diagram of a 40-MHz PPDU with four content channels. Resource indication information included in a signal field B (CC 1) on first 10 MHz may be used to indicate a resource unit allocation status on a 106-tone RU on the first 10 MHz. Resource indication information included in a signal field B (CC 2) on second 10 MHz may be used to indicate a resource unit allocation status on a 106-tone RU on the second 10 MHz. Resource indication information included in a signal field B (CC 3) on third 10 MHz may be used to indicate a resource unit allocation status on a 106-tone RU on the third 10 MHz. Resource indication information included in a signal field B (CC 4) on fourth 10 MHz may be used to indicate a resource unit allocation status on a 106-tone RU on the fourth 10 MHz. Fields other than the signal field B are not described herein again.

In still another example, FIG. 18D is a schematic structural diagram of a 20-MHz PPDU with one content channel. Resource indication information included in a signal field B on first 10 MHz is the same as that included in a signal field B on second 10 MHz, and may be used to indicate a resource unit allocation status on a 242-tone RU formed by the first 10 MHz and the second 10 MHz, that is, the resource indication information in the signal field B is replicated on each 10 MHz. The signal field B may further include a user field corresponding to a resource unit on 10 MHz on which the signal field B is located. The user field may include service type indication information used to indicate a service type of data carried on the resource unit. It may be understood that, according to the method provided in this embodiment of this application, an 80-MHz PPDU, an 80-MHz+80-MHz PPDU, a 160-MHz PPDU, or the like may be further obtained through extension.

Figure 19A:
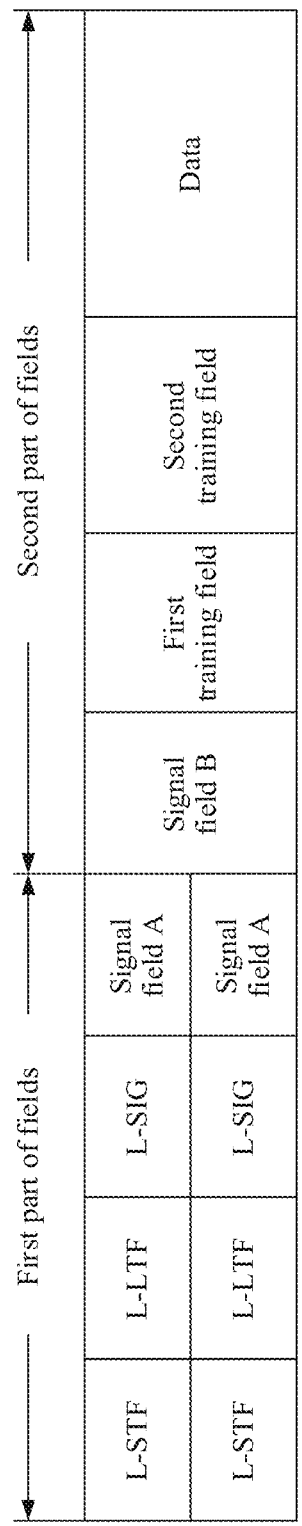
FIG. 19A is a schematic structural diagram of another 20-MHz PPDU according to an embodiment of this application.

Case 4: FIG. 19A is a schematic structural diagram of another 20-MHz PPDU according to an embodiment of this application. Meanings represented by an L-STF, an L-LTF, an L-SIG, an RL-SIG, and a signal field A are the same as the meanings represented by the corresponding fields in the case 1. Details are not described again in this application. Meanings represented by a first training field, a second training field, and data (Data) field are the same as the meanings represented by the corresponding fields in the case 1.

It should be noted that a SIG-B field in FIG. 19A may include resource indication information, and the resource indication information may be used to indicate a resource unit allocation status on a 242-tone RU on 20 MHz.

FIG. 19B is a schematic structural diagram of a 40-MHz PPDU according to an embodiment of this application. Resource indication information included in a signal field B (CC 1) may be used to indicate a resource unit allocation status on a 242-tone RU on first 20 MHz. Resource indication information included in a signal field B (CC 2) may be used to indicate a resource unit allocation status on a 242-tone RU on second 20 MHz.

FIG. 19C is a schematic structural diagram of an 80-MHz PPDU according to an embodiment of this application. Resource indication information included in a signal field B (CC 1) on first 20 MHz is the same as that included in a signal field B (CC 1) on third 20 MHz, and the resource indication information included in the signal field B (CC 1) may be used to indicate resource unit allocation on a 242-tone RU on the first 20 MHz and a 242-tone RU on the third 20 MHz. A signal field B (CC 2) on second 20 MHz is the same as that on fourth 20 MHz, and resource indication information included in the signal field B (CC 2) may be used to indicate resource unit allocation on a 242-tone RU on the second 20 MHz and a 242-tone RU on the fourth 20 MHz. Functions of fields other than the signal field B are similar to those in FIG. 19A. Details are not described again.

FIG. 19D is a schematic structural diagram of another 80-MHz PPDU according to an embodiment of this application. Resource indication information included in a signal field B (CC 1) on first 20 MHz may be used to indicate a resource unit allocation status on a 242-tone RU on the first 20 MHz. Resource indication information included in a signal field B (CC 2) on second 20 MHz may be used to indicate resource unit allocation on a 242-tone RU on the second 20 MHz. Resource indication information included in a signal field B (CC 3) on third 20 MHz may be used to indicate resource unit allocation on a 242-tone RU on the third 20 MHz. Resource indication information included in a signal field B (CC 4) on fourth 20 MHz may be used to indicate resource unit allocation on a 242-tone RU on the fourth 20 MHz. Functions of fields other than the signal field B are similar to those in FIG. 19A. Details are not described again.

It may be understood that, with the method in this embodiment of this application, an 80-MHz+80-MHz PPDU, a 160-MHz PPDU, or the like may be further obtained through extension.

Based on the case 1, the case 2, the case 3, and the case 4, it may be understood that the resource indication information included in the PPDU may be used to indicate a resource unit allocation status within a range of one or more 106-tone RUs, or used to indicate a resource unit allocation status within a range of one or more 242-tone RUs.

In an embodiment, in the case 1, the resource indication information may be carried in the signal field A. In the case 2, the case 3, and the case 4, the resource indication information may be carried in the signal field B. A field in which the resource indication information is carried is not limited in this application.

Embodiment 10

This embodiment of this application provides a resource indication method.

Based on the case 1, the case 2, the case 3, and the case 4, in another resource indication method, resource indication information included in a PPDU may be used to indicate an RU. The RU may be used to carry data.

In an embodiment, the resource indication information indicates a resource unit closest to a right side (that is, an RU with a highest frequency) in each P×10-MHz frequency-domain resource. For example, an RU on a rightmost side (that is, an RU with a highest frequency) of each row of a tone distribution on a bandwidth in Embodiment 1, Embodiment 3, Embodiment 5, or Embodiment 7 is always used. Table 1 shows an example of different resource units corresponding to different values of the resource indication information.

TABLE 1

| Resource indication information | Description |
| --- | --- |
| 0 | 26-tone RU with a highest frequency on a 10-MHz bandwidth |
| 1 | 52-tone RU with a highest frequency on a 10-MHz bandwidth |
| 2 | 106-tone RU on a 10-MHz bandwidth |
| 3 | 242-tone RU on a 20-MHz bandwidth |
| 4 | 484-tone RU on a 40-MHz bandwidth |
| 5 | 242-tone RU + 242-tone RU + 242-tone RU on a 60-MHz bandwidth |
| 6 | 106-tone RU + 106-tone RU on a 20-MHz bandwidth |
| 7 | 242-tone RU + 242-tone RU on a 40-MHz bandwidth |
| 8 | 106-tone RU + 106-tone + RU + 106-tone RU + 106-tone RU on a 40-MHz bandwidth |
| 9 | 106-tone RU + 106-tone + RU + 106-tone RU + 106-tone RU + 106-tone RU + 106-tone RU on a 60-MHz bandwidth |
| . . . | . . . |

For example, FIG. 20 is a schematic diagram of a PPDU according to an embodiment of this application. As shown in FIG. 20, a bandwidth of the entire PPDU is 10 MHz, and resource indication information indicates that a 52-tone RU closest to a right side on the 10-MHz bandwidth is used to transmit a security-related service. Refer to Table 1. In this case, a value of the resource indication information is 1.

It should be noted that a correspondence between resource indication information and an RU is not limited to a case in Table 1. For example, in Table 1, 0 corresponds to the 26-tone RU with the highest frequency on the 10-MHz bandwidth, and 1 corresponds to the 52-tone RU with the highest frequency on the 10-MHz bandwidth. Actually, alternatively, 0 may correspond to the 52-tone RU with the highest frequency on the 10-MHz bandwidth, and 1 may correspond to the 26-tone RU with the highest frequency on the 10-MHz bandwidth.

In another embodiment, an RU with a highest frequency may not be fixedly used, but an RU is freely selected. This manner is applicable to a case in which some RUs in a frequency-domain resource are interfered with, and another RU that is not interfered with is selected to carry data, to avoid interference. Based on this, an RU of any size on an entire bandwidth needs to have corresponding resource indication information. For details, refer to Table 2.

TABLE 2

| Resource indication information | Description |
| --- | --- |
| 0-26 | 26-tone RU on 60 MHz |
| 27-38 | 52-tone RU on 60 MHz |
| 39-44 | 106-tone RU on 60 MHz |
| 45-47 | 242-tone RU on 60 MHz |
| 48-49 | 484-tone RU on 60 MHz |
| 50 | 242-tone RU + 242-tone RU on 60 MHz |
| 51 | 242-tone RU + 242-tone RU + 242-tone RU on 60 MHz |

Figure 21:
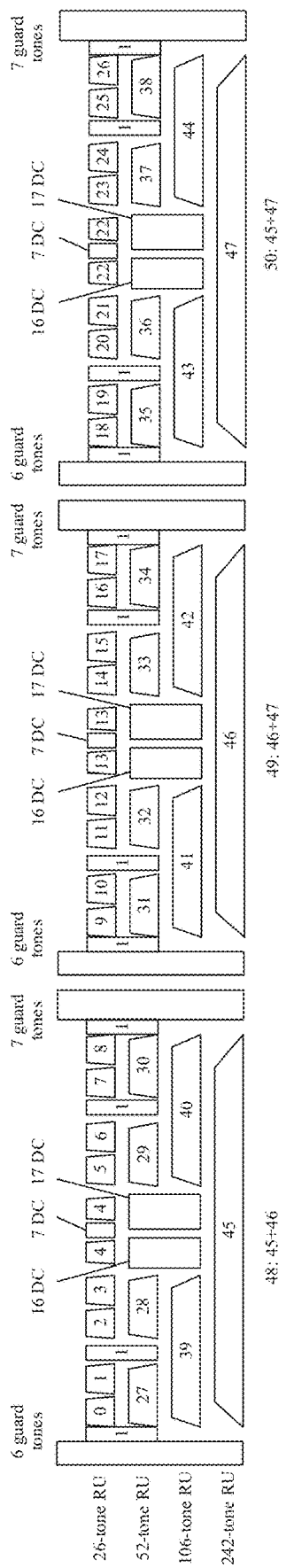
FIG. 21 is a schematic distribution diagram of tones on 60 MHz according to an embodiment of this application.

In an embodiment, FIG. 21 is a schematic distribution diagram of tones on 60 MHz according to an embodiment of this application. As shown in FIG. 21, when resource indication information is 0, it represents an RU 0 in FIG. 21; when resource indication information is 1, it represents an RU 1 in FIG. 21, and so on.

It should be noted that, when a bandwidth of a PPDU is less than 60 MHz, the foregoing numbers are also applicable, but cannot indicate an RU that exceeds a bandwidth size. For example, when the bandwidth is 10 MHz, an RU 9 to an RU 26 cannot be indicated. Certainly, corresponding resource indication information tables may also be redesigned for different bandwidths.

In another optional manner, similar to the solution in Table 1, when the bandwidth is greater than 10 MHz, the resource indication information may indicate that a resource unit corresponding to a full bandwidth is used, and flexibly indicate an RU when the bandwidth is less than 10 MHz. Table 3 shows an example mapping relationship between a value of resource indication information and a corresponding resource unit. It may be understood that the mapping relationship between a value of resource indication information and a corresponding resource unit is changeable. For example, when a value of resource indication information is 0, an RU 45, an RU 46, and an RU 47 may be indicated; or when a value of resource indication information is 11, an RU 0 may be indicated.

TABLE 3

| Resource indication information | Description |
| --- | --- |
| 0 | RU 0 |
| 1 | RU 1 |
| 2 | RU 2 |
| 3 | RU 3 |
| 4 | RU 27 |
| 5 | RU 28 |
| 6 | RU 39 |
| 7 | RU 45 |
| 8 | RU 45 + RU 46 |
| 9 | RU 46 + RU 47 |
| 10 | RU 45 + RU 47 |
| 11 | RU 45 + RU 46 + RU 47 |

Embodiment 11

This embodiment of this application provides another resource indication method.

The resource indication information included in the PPDU shown in FIG. 18A, FIG. 18B, and FIG. 18C may be used to indicate a resource unit allocation status within a range of one or more 106-tone RUs.

The resource indication information included in the PPDU shown in FIG. 18D, FIG. 19A, FIG. 19B, FIG. 19C, and FIG. 19D may be used to indicate a resource unit allocation status within a range of one or more 242-tone RUs.

In an embodiment, the resource indication information may simultaneously indicate that a plurality of RUs are allocated. This is usually referred to as frequency multiplexing. This embodiment of this application first describes an RU indication manner within a range of 10 MHz. A method thereof is to list all possible RU arrangement combinations, and indicate different RUs by using different indexes. For details, refer to Table 4.

TABLE 4

| Index | Description | | | |
|---|---|---|---|---|
| 0 | 26 | 26 | 26 | 26 |
| 1 | 26 | 26 | 52 | |
| 2 | 52 | 26 | 26 | |
| 3 | 52 | 52 | | |
| 4 | 106 | | | |
| 5 | 242 (for ≥ 242 tone RUs) | | | |
| 6 | 2 × 242 (for ≥ 484-tone RUs) | | | |
| 7 | 3 × 242 (for ≥ 3 × 242-tone RUs) | | | |

For example, when an entire bandwidth is divided into one 26-tone RU, one 26-tone RU, and one 52-tone RU, resource indication information is 1. For another example, when an entire bandwidth is divided into one 52-tone RU and one 52-tone RU, resource indication information is 3.

It should be noted that, in an embodiment, the resource indication information may be represented by using a decimal notation. For example, a decimal notation is used for all of Table 1, Table 2, Table 3, and Table 4. Certainly, the resource indication information may be alternatively represented by using a binary notation. This is not limited in this application.

Figure 22:
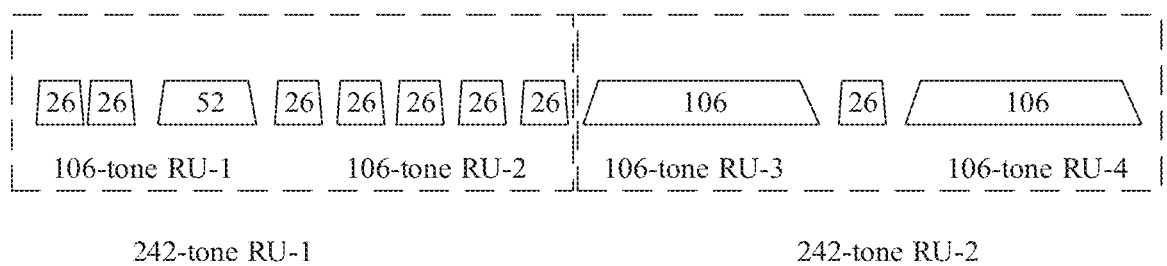
FIG. 22 is a schematic diagram of resource unit allocation of a frequency-domain resource greater than 10 MHz according to an embodiment of this application.

Resource indication information included in a PPDU may be used to indicate a resource unit allocation status within a range of one or more 242-tone RUs. In an embodiment, within a range of one 242-tone RU, resource unit indication information may include a first resource indication subfield, a second resource indication subfield, and a third resource indication subfield. The first resource indication subfield is used to indicate an RU allocation status on a first 106-tone RU in the 242-tone RU. The second resource indication subfield is used to indicate an RU allocation status on a second 106-tone RU in the 242-tone RU. The third resource indication subfield is used to indicate an allocation status on a 26-tone RU between the first 106-tone RU and the second 106-tone RU. FIG. 22 is a schematic diagram of resource unit allocation of a frequency-domain resource greater than 10 MHz according to an embodiment of this application. With reference to FIG. 22 and Table 4, for a 242-tone RU-1, resource indication information includes a first resource indication subfield and a second resource indication subfield. The first resource indication subfield is used to indicate an RU allocation status on a 106-tone RU-1. The second resource indication subfield is used to indicate an RU allocation status on a 106-tone RU-2. The resource indication information further includes a third resource indication subfield, and the third resource indication subfield may occupy one bit. The third resource indication subfield is used to indicate an RU allocation status on a 26-tone RU between the 106-tone RU-1 and the 106-tone RU-2. If the 26-tone RU is occupied, the third resource indication subfield is set to 1. If the 26-tone RU is not occupied, the third resource indication subfield is set to 0. Likewise, for a 242-tone RU-2, resource indication information includes a first resource indication subfield and a second resource indication subfield. The first resource indication subfield is used to indicate an RU allocation status on a 106-tone RU-3. The second resource indication subfield is used to indicate an RU allocation status on a 106-tone RU-4. The resource indication information further includes a third resource indication subfield, and the third resource indication subfield may occupy one bit. The third resource indication subfield is used to indicate an RU allocation status on a 26-tone RU between the 106-tone RU-3 and the 106-tone RU-4. If the 26-tone RU is occupied, the third resource indication subfield is set to 1. If the 26-tone RU is not occupied, the third resource indication subfield is set to 0. The resource indication information belongs to a common part, and for a station-specific part, indication is also performed on a corresponding CC according to a predetermined sequence allocated in an RU.

Using the 80 MHz-PPDU shown in FIG. 19C as an example, resource indication information in SIG-Bs included in first 20 MHz and third 20 MHz in the PPDU may indicate a resource allocation status within a range of a 242-tone RU corresponding to the first 20 MHz, and further indicate a resource allocation status within a range of a 242-tone RU corresponding to the third 20 MHz. In this case, the SIG-Bs may include two groups of first resource indication subfields, second resource indication subfields, and third resource indication subfields. A first resource indication subfield in a first group is used to indicate a resource unit allocation status on a 106-tone RU 1 on the first 20 MHz. A second resource indication subfield in the first group is used to indicate a resource unit allocation status on a 106-tone RU 2 on the first 20 MHz. A third resource indication subfield in the first group is used to indicate an RU allocation status on a 26-tone RU between the 106-tone RU-1 and the 106-tone RU-2 on the first 20 MHz. A first resource indication subfield in a second group is used to indicate a resource unit allocation status on a 106-tone RU 1 on the third 20 MHz. A second resource indication subfield in the second group is used to indicate a resource unit allocation status on a 106-tone RU 2 on the third 20 MHz. A third resource indication subfield in the second group is used to indicate an RU allocation status on a 26-tone RU between the 106-tone RU-1 and the 106-tone RU-2 on the third 20 MHz. Likewise, resource indication information in SIG-Bs included in second 20 MHz and fourth 20 MHz in the PPDU may indicate a resource allocation status within a range of a 242-tone RU corresponding to the second 20 MHz, and further indicate a resource allocation status within a range of a 242-tone RU corresponding to the fourth 20 MHz. In this case, the SIG-Bs may include two groups of first resource indication subfields, second resource indication subfields, and third resource indication subfields. Details are not described again.

In another embodiment, resource indication information may be replicated on two 10-MHz bandwidths corresponding to a 242-tone RU. As shown in FIG. 18D, the resource indication information indicates a resource unit allocation status on a 242-tone RU corresponding to 20 MHz, and the resource indication information may be carried in a signal field B. To be specific, the resource indication information is replicated on two 10-MHz CCs on which the signal field B is located, and for a station-specific part, indication may be separately performed for each 10 MHz. For example, both a signal field B on a first 10-MHz channel and a signal field B on a second 10-MHz channel may use an 8-bit resource indication subfield to indicate an RU allocation status on a 242-tone RU. A user field included in a signal field B may indicate a service type of data carried in an RU included in a 10-MHz channel corresponding to the signal field B. A value of the user field may be a service type identifier, for example, a provider service ID (Provider Service Identifier, PSID). OFDMA transmission is performed by using a method of adding different types of services to different RUs.

To sum up, in this embodiment of this application, a first part of fields include resource indication information, and the resource indication information is used to indicate an RU allocation status within a range of a 106-tone RU or a 242-tone RU. With the method, a resource allocation status can be effectively indicated.

Embodiment 12

For Embodiment 2, Embodiment 4, Embodiment 6, and Embodiment 8, a first part of the fields, a second part of fields, and a third part of the fields each may include the following content.

Figure 23:
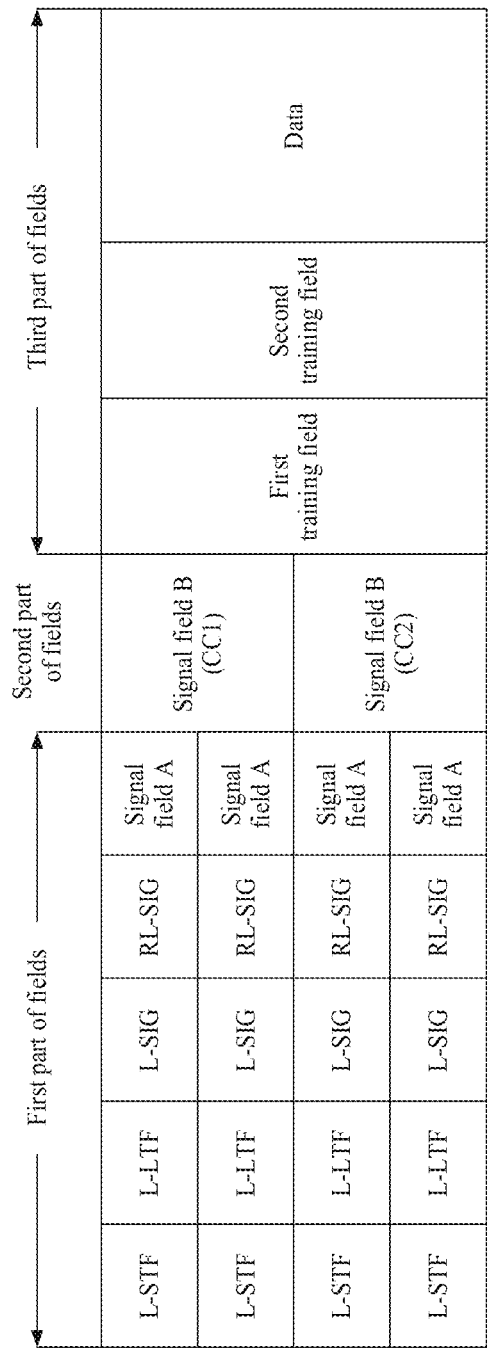
FIG. 23 is a schematic diagram of a 40-MHz PPDU according to an embodiment of this application.

FIG. 23 is a schematic diagram of a 40-MHz PPDU according to an embodiment of this application. As shown in FIG. 23, a first part of fields may include an L-STF, an L-LTF, an L-SIG, an RL-SIG, and a signal field A. A second part of fields may include a signal field B. A third part of fields include a first training field, a second training field, and data field. Meanings of the fields in FIG. 23 are the same as the meanings of the corresponding fields in FIG. 18. Details are not described again in this application.

Case 1: Resource indication information is used to indicate an RU. First, a case in which a location is fixedly used for an RU of a specific size is considered. For example, an RU on a rightmost side (that is, an RU with a highest frequency) of each row of a tone distribution on a bandwidth in Embodiment 2, Embodiment 4, Embodiment 6, or Embodiment 8 is always used. The indication is shown in Table 1.

Case 2: An RU with a highest frequency may not be fixedly used, but an RU is freely selected. This case is applicable to a case in which an RU is interfered with, and another RU may be used to avoid interference. Based on this, an RU of any size on an entire bandwidth needs to have corresponding resource indication information. For details, refer to Table 2.

Optionally, similar to the solution in Table 1, when a bandwidth is greater than 10 MHz, a full bandwidth is fixedly used, and an RU is flexibly indicated only when a bandwidth is less than 10 MHz. Therefore, indication may be performed by using Table 3.

Case 3: If a PPDU is multi-service data sent by a transmit end, the PPDU further includes resource indication information, and the resource indication information is used to indicate an RU allocation status within a range of a 242-tone RU. For details, refer to Table 5.

TABLE 5

| Resource indication information | #1 | #2 | #3 | #4 | #5 | #6 | #7 | #8 | #9 | Number of entries |
|---|---|---|---|---|---|---|---|---|---|---|
| 00000000 | 26 | 26 | 26 | 26 | 26 | 26 | 26 | 26 | 26 | 1 |
| 00000001 | 26 | 26 | 26 | 26 | 26 | 26 | 26 | 52 | | 1 |
| 00000010 | 26 | 26 | 26 | 26 | 26 | 52 | 26 | 26 | | 1 |
| 00000011 | 26 | 26 | 26 | 26 | 26 | 52 | | 52 | | 1 |
| 00000100 | 26 | 26 | 52 | | 26 | 26 | 26 | 26 | 26 | 1 |
| 00000101 | 26 | 26 | 52 | | 26 | 26 | 26 | 52 | | 1 |
| 00000110 | 26 | 26 | 52 | | 26 | 52 | | 26 | 26 | 1 |
| 00000111 | 26 | 26 | 52 | | 26 | 52 | | 52 | | 1 |
| 00001000 | 52 | | 26 | 26 | 26 | 26 | 26 | 26 | 26 | 1 |
| 00001001 | 52 | | 26 | 26 | 26 | 26 | 26 | 52 | | 1 |
| 00001010 | 52 | | 26 | 26 | 26 | 52 | | 26 | 26 | 1 |
| 00001011 | 52 | | 26 | 26 | 26 | 52 | | 52 | | 1 |
| 00001100 | 52 | | 52 | | 26 | 26 | 26 | 26 | 26 | 1 |
| 00001101 | 52 | | 52 | | 26 | 26 | 26 | 52 | | 1 |
| 00001110 | 52 | | 52 | | 26 | 52 | | 26 | 26 | 1 |
| 00001111 | 52 | | 52 | | 26 | 52 | | 52 | | 1 |
| $00010y_2y_1y_0$ | 52 | | 52 | | — | | 106 | | | 8 |
| $00011y_2y_1y_0$ | | 106 | | | — | 52 | | 52 | | 8 |
| $00100y_2y_1y_0$ | 26 | 26 | 26 | 26 | 26 | | 106 | | | 8 |
| $00101y_2y_1y_0$ | 26 | 26 | | 52 | 26 | | 106 | | | 8 |
| $00110y_2y_1y_0$ | 52 | | 26 | 26 | 26 | | 106 | | | 8 |
| $00111y_2y_1y_0$ | 52 | | 52 | | 26 | | 106 | | | 8 |
| $01000y_2y_1y_0$ | | 106 | | | 26 | 26 | 26 | 26 | 26 | 8 |
| $01001y_2y_1y_0$ | | 106 | | | 26 | 26 | 26 | 52 | | 8 |
| $01010y_2y_1y_0$ | | 106 | | | 26 | 52 | | 26 | 26 | 8 |
| $01011y_2y_1y_0$ | | 106 | | | 26 | 52 | | 52 | | 8 |
| $0110y_1y_0z_1z_0$ | | 106 | | | — | | 106 | | | 16 |
| 01110000 | 52 | | 52 | | — | 52 | | 52 | | 1 |
| 01110001 | | | | 242-tone RU empty | | | | | | 1 |
| | | | | Empty 242-tone RU | | | | | | |
| 01110010 | | | | 484-tone RU with zero User fields indicated in this RU Allocation subfield of the HE-SIG-B content channel (#13407) A resource unit allocation subfield of the HE-SIG-B content channel indicates a 484-tone RU including zero user fields. | | | | | | 1 |
| 01110011 | | | | 996-tone RU with zero User fields indicated in this RU Allocation subfield of the HE-SIG-B content channel (#13407) | | | | | | 1 |

TABLE 5-continued

| Resource indication information | #1 | #2 | #3 | #4 | #5 | #6 | #7 | #8 | #9 | Number of entries |
|---|---|---|---|---|---|---|---|---|---|---|
| | | | A resource unit allocation subfield of the HE-SIG-B content channel indicates a 996-tone RU including zero user fields. | | | | | | | |
| $011101x_1x_0$ | | | | | Reserved | | | | | 4 |
| | | | | | Reserved | | | | | |
| $01111y_2y_1y_0$ | | | | | Reserved | | | | | 8 |
| $10y_2y_1y_0z_2z_1z_0$ | | | 106 | | 26 | | 106 | | | 64 |
| $11000y_2y_1y_0$ | | | | | 242 | | | | | 8 |
| $11001y_2y_1y_0$ | | | | | 484 | | | | | 8 |
| $11010y_2y_1y_0$ | | | | | 996 | | | | | 8 |
| $11011y_2y_1y_0$ | | | | | Reserved | | | | | 8 |
| $111x_4x_3x_2x_1x_0$ | | | | | Reserved | | | | | 32 |

In this case, two 10-MHz bandwidths are combined, and a size of a 242-tone RU is used as a unit for indicating an RU. For example, as shown in FIG. 22, there are four 10-MHz channels. Resource indication is uniformly performed for a channel 1 and a channel 2, and resource indication is uniformly performed for a channel 3 and a channel 4. To be specific, an 8-bit index indication of 802.11ax is reused, to separately indicate resource unit allocation statuses on a first 242-tone RU and a second 242-tone RU.

Further, because an OCB is used in 802.11p, no association identifier of a STA exists in this technical solution of this application. This application proposes to replace an association identifier of a STA with a PSID of service knowledge information included in carried data. OFDMA transmission is performed by using a method of adding different services to different RUs.

To sum up, in this embodiment of this application, a first part of fields include resource indication information, and the resource indication information is used to indicate at least one RU. With the method, a resource allocation status can be effectively indicated.

Embodiment 13

Figure 24:
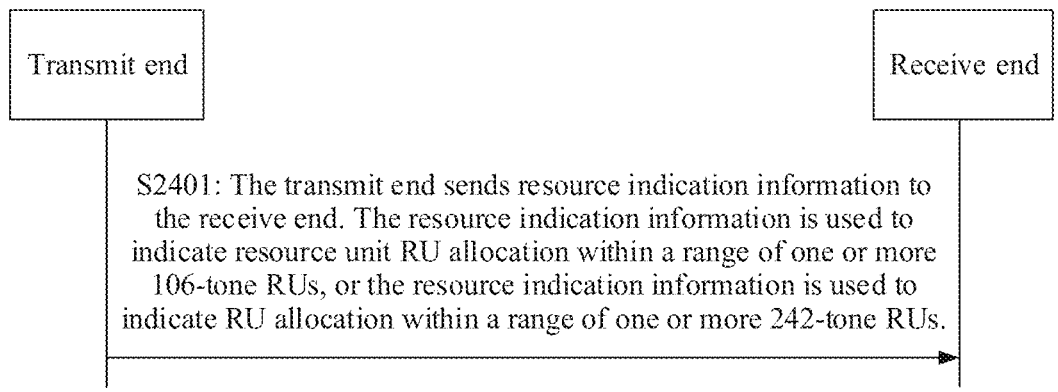
FIG. 24 is a flowchart of a resource indication method according to an embodiment of this application.

FIG. 24 is a flowchart of a resource indication method according to an embodiment of this application. As shown in FIG. 24, the method includes the following operations:

Operation S2401: A transmit end sends resource indication information to a receive end. The resource indication information is used to indicate resource unit RU allocation within a range of one or more 106-tone RUs, or the resource indication information is used to indicate RU allocation within a range of one or more 242-tone RUs.

In an embodiment, when the resource indication information is used to indicate RU allocation within a range of one 242-tone RU, the resource unit indication information includes a first resource indication subfield, a second resource indication subfield, and a third resource indication subfield. The first resource indication subfield is used to indicate an RU allocation status on a first 106-tone RU in the 242-tone RU. The second resource indication subfield is used to indicate an RU allocation status on a second 106-tone RU in the 242-tone RU. The third resource indication subfield is used to indicate an allocation status on a 26-tone RU between the first 106-tone RU and the second 106-tone RU.

In an embodiment, the resource indication information is replicated on two 10-MHz bandwidths corresponding to the 242-tone RU.

Embodiment 14

For Embodiment 1 to Embodiment 12, a first part of fields include a signal field A, and the signal field A includes signaling information used for parsing a PPDU. The signal field A may be an NGV-SIG-A.

The signal field A occupies one symbol.

Alternatively, the signal field A occupies two symbols. The signal field A has same signaling information and a same interleaving mode on the two symbols.

Alternatively, the signal field A occupies two symbols. The signal field A has same signaling information and different interleaving modes on the two symbols. For example, interleaving is performed on a first symbol, and no interleaving is performed on a second symbol.

Figure 25:
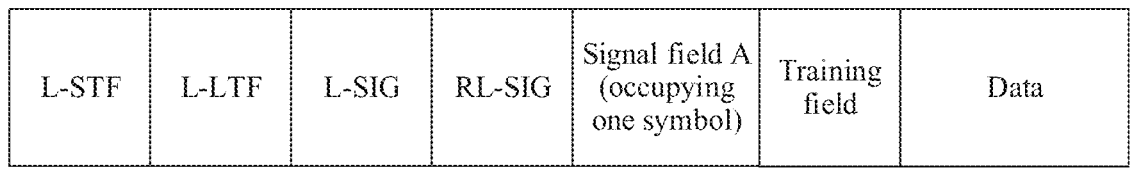
FIG. 25 is a schematic diagram of a PPDU according to an embodiment of this application.

In an embodiment, FIG. 25 is a schematic diagram of a PPDU according to an embodiment of this application. As shown in FIG. 25, an NGV-SIG-A occupies one symbol. This case in which only one symbol is transmitted may be referred to as a short NGV PPDU mode. On the contrary, a case in which two symbols are transmitted may be referred to as a long NGV PPDU mode. Optionally, the NGV-SIG-A includes distinguishing indication information of the short/long NGV PPDU mode, and the indication information is used to indicate whether the short NGV PPDU mode or the long NGV PPDU mode is used for an NGV PPDU. Obviously, system overheads can be reduced in the short NGV PPDU mode. When the NGV-SIG-A occupies two symbols, information in a second symbol is the same as that in a first symbol, and a replication manner is used between the two symbols. Alternatively, when the NGV-SIG-A occupies two symbols, a non-interleaving mode is used for a second symbol, that is, no interleaving is performed, so that frequency diversity is formed between the second symbol and a first symbol, thereby enhancing robustness. Compared with anon-HE ER SU mode, this enhances robustness with same overheads. Compared with an HE ER SU mode, this further reduces overheads.

In an embodiment, a first part of fields include an L-LTF, a second part of fields include a training field, and the training field and the L-LTF are jointly used for channel measurement in an STBC scenario. The training field may be an NGV-LTF. The training field occupies one symbol. The L-LTF is multiplied by a first column of a matrix $P_{2*2}$. The training field is multiplied by a second column of the matrix $P_{2*2}$. The matrix P is used to distinguish between a first space-time stream and a second space-time stream, where $$P_{2*2} = \begin{bmatrix} 1 & -1 \\ 1 & 1 \end{bmatrix}.$$

In an embodiment, if an STBC mode is used for a transmit end, an STBC indication bit in the NGV-SIG-A is set to 1. L-LTF sequences in two symbols in an L-LTF sent by an antenna 1 of the transmit end are multiplied by 1, and L-LTF sequences sent by an antenna 2 are also multiplied by 1. The NGV-LTF includes one symbol. An NGV-LTF sequence in an NGV-LTF symbol sent by the antenna 1 is multiplied by −1, and an NGV-LTF sequence in an NGV-LTF symbol sent by the antenna 2 is multiplied by 1. It should be noted that for multiplication by 1, no operation may be performed, and for multiplication by −1, the multiplication may be completed in another form such as phase reversal. This is not limited in this technical solution of this application.

After receiving the NGV PPDU, a receive end obtains channel information by using the L-LTF, demodulates the NGV-SIG-A, and learns that the NGV PPDU is in the STBC mode. The receive end obtains the channel information by using both the L-LTF and the NGV-LTF, and further demodulates a data field in the STBC mode. Optionally, the receive end learns, by using the short/long NGV PPDU mode distinguishing indication information, whether the short NGV PPDU mode or the long NGV PPDU mode is used for the NGV PPDU.

To sum up, the PPDU includes only one training field, and AGC is performed through L-STF multiplexing, so that overheads can be further reduced.

Embodiment 15

The foregoing describes in detail the data transmission method according to the embodiments of this application. The following describes a data transmission apparatus according to an embodiment of this application.

This embodiment of this application describes in detail a schematic structure of a data transmission apparatus.

Figure 26:
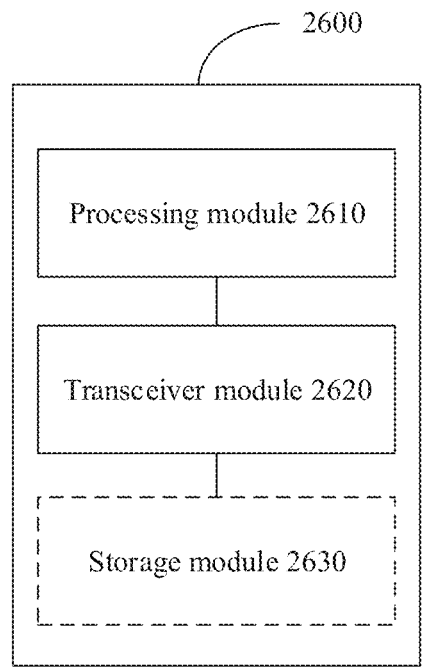
FIG. 26 is a schematic block diagram of a data transmission apparatus 2600 according to an embodiment of this application.

In an example, FIG. 26 is a schematic block diagram of a data transmission apparatus 2600 according to an embodiment of this application. The apparatus 2600 in this embodiment of this application may be the transmit end in the foregoing method embodiments, or may be one or more chips in the transmit end. The apparatus 2600 may be configured to perform some or all functions of the transmit end in the foregoing method embodiments. The apparatus 2600 may include a processing module 2610 and a transceiver module 2620. Optionally, the apparatus 2600 may further include a storage module 2630.

For example, the processing module 2610 may be configured to perform the operation of generating a PPDU in the foregoing method embodiments.

The transceiver module 2620 may be configured to perform the operation of sending a PPDU in the foregoing method embodiments.

Alternatively, the apparatus 2600 may be configured as a general-purpose processing system, for example, generally referred to as a chip. The processing module 2610 may include one or more processors that provide a processing function. The transceiver module 2620 may be, for example, an input/output interface, a pin, or a circuit. The input/output interface may be configured to be responsible for information exchange between the chip and the outside. For example, the input/output interface may output the PPDU generated by the processing module 2610 to another module outside the chip for processing. The processing module 2610 may execute a computer-executable instruction stored in the storage module, to implement a function of the apparatus 2600 in the foregoing method embodiments. In an example, the storage module 2630 optionally included in the apparatus 2600 may be a storage unit in the chip, for example, a register or a cache. Alternatively, the storage module 2630 may be a storage unit that is in the transmit end and that is located outside the chip, for example, a read-only memory (ROM for short), another type of static storage device capable of storing static information and instructions, or a random access memory (RAM for short).

Figure 27:
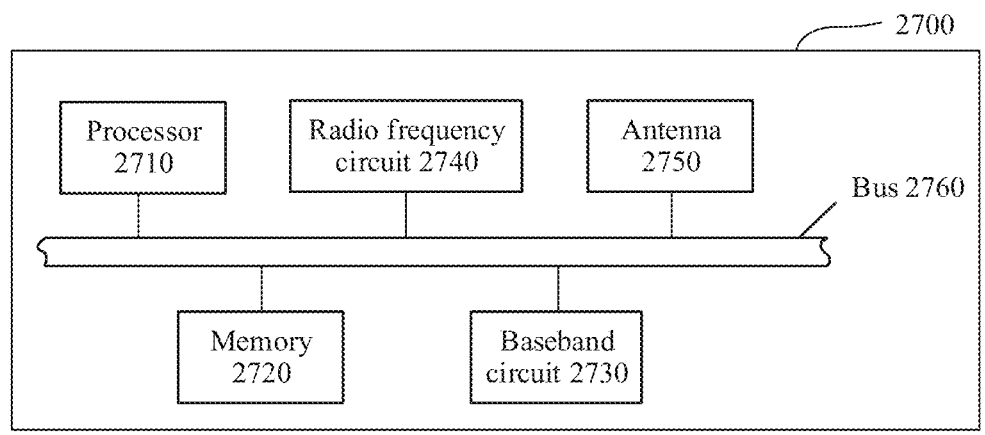
FIG. 27 is a schematic block diagram of another data transmission apparatus 2700 according to an embodiment of this application.

In another example, FIG. 27 is a schematic block diagram of another data transmission apparatus 2700 according to an embodiment of this application. The apparatus 2700 in this embodiment of this application may be the transmit end in the foregoing method embodiments. The apparatus 2700 may be configured to perform some or all functions of the transmit end in the foregoing method embodiments. The apparatus 2700 may include a processor 2710, a baseband circuit 2730, a radio frequency circuit 2740, and an antenna 2750. Optionally, the apparatus 2700 may further include a memory 2720. Components of the apparatus 2700 are coupled together by using a bus 2760. In addition to a data bus, the bus 2760 includes a power bus, a control bus, and a status signal bus. However, for clear description, various types of buses in the figure are marked as the bus system 2760.

The processor 2710 may be configured to control the transmit end and perform processing that is performed by the transmit end in the foregoing embodiments; may perform a processing procedure related to the transmit end in the foregoing method embodiments and/or another process used for the technology described in this application; and may further run an operating system, is responsible for managing a bus, and may execute a program or an instruction stored in the memory.

The baseband circuit 2730, the radio frequency circuit 2740, and the antenna 2750 may be configured to support information sending and receiving between the transmit end and the receive end in the foregoing embodiments, so as to support wireless communication between the transmit end and the receive end.

The memory 2720 may be configured to store program code and data of the transmit end. The memory 2720 may be the storage module 2630 in FIG. 26. It may be understood that the baseband circuit 2730, the radio frequency circuit 2740, and the antenna 2750 may be further configured to support communication between the transmit end and another network entity, for example, support communication between the transmit end and a network element on a core network side. The memory 2720 in FIG. 27 is shown as being separated from the processor 2710. However, a person skilled in the art can easily figure out that the memory 2720 or any part of the memory 2720 may be located outside the apparatus 2700. For example, the memory 2720 may include a transmission line and/or a computer product separated from a wireless node. All these media may be accessed by the processor 2710 by using the bus interface 2760. Alternatively, the memory 2720 or any part of the memory 2720 may be integrated into the processor 2710. For example, the memory 2720 may be a cache and/or a general-purpose register.

It may be understood that FIG. 27 shows merely a simplified design of the transmit end. For example, in actual application, the transmit end may include any quantity of transmitters, receivers, processors, memories, and the like, and all transmit ends capable of implementing the present invention fall within the protection scope of the present invention.

In an embodiment, the data transmission apparatus on the transmit end side may also be implemented by using the following: one or more field-programmable gate arrays (FPGA), a programmable logic device (PLD), a controller, a state machine, a gate logic, a discrete hardware component, any other suitable circuit, or any combination of circuits capable of performing various functions described in this application. In another example, an embodiment of this application further provides a computer storage medium. The computer storage medium may store a program instruction used to indicate any one of the foregoing methods, so that a processor executes the program instruction to implement the methods and the functions related to the transmit end in the foregoing method embodiments.

Figure 28:
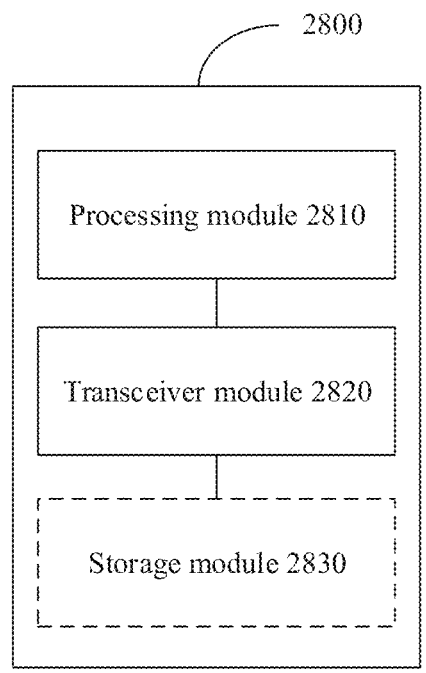
FIG. 28 is a schematic block diagram of a data transmission apparatus 2800 according to an embodiment of this application.

This embodiment of this application describes in detail a schematic structure of a data transmission apparatus. In an example, FIG. 28 is a schematic block diagram of a data transmission apparatus 2800 according to an embodiment of this application. The apparatus 2800 in this embodiment of this application may be the receive end in the foregoing method embodiments, or may be one or more chips in the receive end. The apparatus 2800 may be configured to perform some or all functions of the receive end in the foregoing method embodiments. The apparatus 2800 may include a processing module 2810 and a transceiver module 2820. Optionally, the apparatus 2800 may further include a storage module 2830. The transceiver module 2820 is configured to receive a PPDU.

Alternatively, the apparatus 2800 may be configured as a general-purpose processing system, for example, generally referred to as a chip. The processing module 2810 may include one or more processors that provide a processing function. The transceiver module may be, for example, an input/output interface, a pin, or a circuit. The input/output interface may be configured to be responsible for information exchange between the chip and the outside. The one or more processors may execute a computer-executable instruction stored in the storage module, to implement a function of the receive end in the foregoing method embodiments. In an example, the storage module 2830 optionally included in the apparatus 2800 may be a storage unit in the chip, for example, a register or a cache. Alternatively, the storage module 2830 may be a storage unit that is in the receive end and that is located outside the chip, for example, a read-only memory (read-only memory, ROM for short), another type of static storage device capable of storing static information and instructions, or a random access memory (RAM for short).

Figure 29:
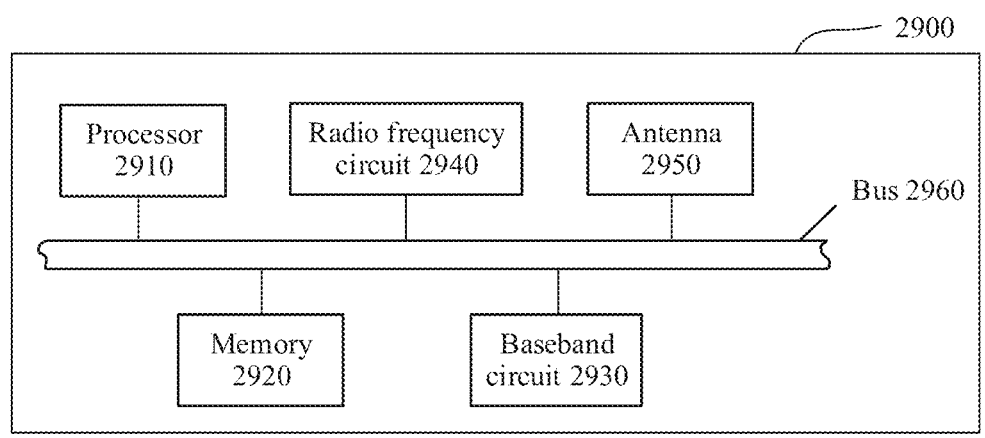
FIG. 29 is a schematic block diagram of another data transmission apparatus 2900 according to an embodiment of this application.

In another example, FIG. 29 is a schematic block diagram of another data transmission apparatus 2900 according to an embodiment of this application. The apparatus 2900 in this embodiment of this application may be the receive end in the foregoing method embodiments. The apparatus 2900 may be configured to perform some or all functions of the receive end in the foregoing method embodiments. The apparatus 2900 may include a processor 2910, a baseband circuit 2930, a radio frequency circuit 2940, and an antenna 2950. Optionally, the apparatus 2900 may further include a memory 2920. Components of the apparatus 2900 are coupled together by using a bus 2960. In addition to a data bus, the bus system 2960 includes a power bus, a control bus, and a status signal bus. However, for clear description, various types of buses in the figure are marked as the bus system 2960.

The processor 2910 may be configured to control the receive end and perform processing that is performed by the receive end in the foregoing embodiments; may perform a processing procedure related to the receive end in the foregoing method embodiments and/or another process used for the technology described in this application; and may further run an operating system, is responsible for managing a bus, and may execute a program or an instruction stored in the memory.

The baseband circuit 2930, the radio frequency circuit 2940, and the antenna 2950 may be configured to support information sending and receiving between the receive end and the transmit end in the foregoing embodiments, so as to support wireless communication between the transmit end and the receive end. The memory 2920 may be configured to store program code and data of the transmit end. The memory 2920 may be the storage module 2830 in FIG. 28. It may be understood that the baseband circuit 2930, the radio frequency circuit 2940, and the antenna 2950 may be further configured to support communication between the receive end and another network entity.

It may be understood that FIG. 29 shows merely a simplified design of the receive end. For example, in actual application, the receive end may include any quantity of transmitters, receivers, processors, memories, and the like, and all receive ends capable of implementing the present invention fall within the protection scope of the present invention.

In an embodiment, the data transmission apparatus on the receive end may also be implemented by using the following: one or more field-programmable gate arrays (FPGA), a programmable logic device (PLD), a controller, a state machine, a gate logic, a discrete hardware component, any other suitable circuit, or any combination of circuits capable of performing various functions described in this application.

In still another example, an embodiment of this application further provides a computer storage medium. The computer storage medium may store a program instruction used to indicate any one of the foregoing methods, so that a processor executes the program instruction to implement the methods and the functions related to the receive end in the foregoing method embodiments.

The processor in the apparatus 2700 and the apparatus 2900 may be a general-purpose processor, for example, a general-purpose central processing unit (CPU), a network processor (NP for short), or a microprocessor; or may be an application-specific integrated circuit (ASIC for short) or one or more integrated circuits configured to control program execution in the solutions of this application; or may be a digital signal processor (DSP for short), a field-programmable gate array (FPGA for short) or another programmable logic device, a discrete gate or transistor logic device, or a discrete hardware component. Alternatively, the controller/processor may be a combination of processors implementing a computing function, for example, a combination of one or more microprocessors, or a combination of the DSP and a microprocessor. The processor usually performs logical and arithmetic operations based on a program instruction stored in the memory.

The memory in the apparatus 2700 and the apparatus 2900 may further store an operating system and another application program. Specifically, the program may include program code, and the program code includes a computer operation instruction. More specifically, the memory may be a read-only memory (ROM for short), another type of static storage device capable of storing static information and instructions, a random access memory (RAM for short), another type of dynamic storage device capable of storing information and instructions, a magnetic disk memory, or the like. The memory may be a combination of the foregoing types of storage. In addition, the computer-readable storage medium/memory may be in the processor, or may be outside the processor, or may be distributed on a plurality of entities including a processor or a processing circuit. The computer-readable storage medium/memory may be embodied in a computer program product. For example, the computer program product may include a computer-readable medium in a packaging material.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

An embodiment of this application provides a computer storage medium, including a program instruction. The program instruction is used to implement the data transmission method in any one of the foregoing embodiments.

What is claimed is:

1. A transmit end, comprising:
a processor to generate a physical layer protocol data unit (PPDU); and
a transceiver to send the PPDU to a receive end,
wherein a bandwidth of the PPDU is P×10 megahertz MHz, the PPDU comprises a first part of fields and a second part of the fields, wherein a quantity of tones per 10-MHz tone distribution corresponding to the first part of the fields is 64 and a tone spacing is 156.25 kHz, wherein a quantity of tones per 10-MHz tone distribution corresponding to the second part of the fields is 128 and a tone spacing is 78.125 kHz, and wherein P is a positive integer greater than or equal to 1,
wherein each 10-MHz tone distribution corresponding to the second part of fields comprises M1 26-tone resource units (RUs), M2 52-tone RUs, M3 106-tone RUs, M4 guard tones, M5 null tones, and M6 direct current tones, and
wherein M1×26+M2×52+M3×106+M4+M5+M6=128, and wherein M1, M2, M3, M4, M5, and M6 are integers greater than or equal to 0.

2. The transmit end according to claim 1, wherein
M1=4, M2=0, M3=0, and M4+M5+M6=24; M41 guard tones and M42 guard tones are provided on two sides of the four 26-tone RUs, and M41+M42=M4,
M1=0, M2=2, M3=0, and M4+M5+M6=24; M43 guard tones and M44 guard tones are provided on two sides of the two 52-tone RUs, and M43+M44=M4,
M1=0, M2=0, M3=1, and M4+M5+M6=22; M45 guard tones and M46 guard tones are provided on two sides of the two 52-tone RUs, and M45+M46=M4, or
M1=2, M2=1, M3=0, and M4+M5+M6=24; M47 guard tones and M48 guard tones are provided on two sides of the two 26-tone RUs and the one 52-tone RU, and M47+M48=M4.

3. The transmit end according to claim 2, wherein
M1=2, M2=0, M3=0, M41=9, M42=8, M5=2, and M6=5,
M1=0, M2=2, M3=0, M43=9, M44=8, M5=2, and M6=5,
M1=0, M2=0, M3=1, M45=9, M46=8, M5=0, and M6=5, or
M1=2, M2=1, M3=0, M47=9, M48=8, M5=2, and M6=5.

4. The transmit end according to claim 3, wherein
when M41=9 and M42=8, M41 guard tones fall within a range of [−64, −56] and M42 guard tones fall within a range of [56, 63]; or M41 guard tones fall within the range of [56, 63] and M42 guard tones fall within the range of [−64, −56];
when M43=9 and M44=8, M43 guard tones fall within the range of [−64, −56] and M44 guard tones fall within the range of [56, 63]; or M43 guard tones fall within the range of [56, 63] and M44 guard tones fall within the range of [−64, −56];
when M45=9 and M46=8, M45 guard tones fall within the range of [−64, −56] and M46 guard tones fall within the range of [56, 63]; or M45 guard tones fall within the range of [56, 63] and M46 guard tones fall within the range of [−64, −56]; and
when M47=9 and M48=8, M47 guard tones fall within the range of [−64, −56] and M48 guard tones fall within the range of [56, 63]; or M47 guard tones fall within the range of [56, 63] and M48 guard tones fall within the range of [−64, −56].

5. A transmit end, comprising:
a processor to generate a physical layer protocol data unit (PPDU), and
a transceiver to send the PPDU to a receive end,
wherein a bandwidth of the PPDU is P×10 megahertz MHz, the PPDU comprises a first part of fields and a second part of the fields, wherein a quantity of tones per 10-MHz tone distribution corresponding to the first part of the fields is 64 and a tone spacing is 156.25 kHz, wherein a quantity of tones per 10-MHz tone distribution corresponding to the second part of the fields is 128 and a tone spacing is 78.125 kHz, and wherein P is a positive integer greater than or equal to 1, and
wherein the first part of the fields comprises resource indication information, wherein the resource indication information is used to indicate resource unit (RU) allocation within a range of one or more 106-tone RUs, or the resource indication information is used to indicate RU allocation within a range of one or more 242-tone RUs.

6. The transmit end according to claim 5, wherein
when the resource indication information is used to indicate the RU allocation within a range of one or more 242-tone RUs, for RU allocation within a range of any 242-tone RU, the resource indication information comprises:

a first resource indication subfield used to indicate an RU allocation status on a first 106-tone RU in the 242-tone RU, a second resource indication subfield used to indicate an RU allocation status on a second 106-tone RU in the 242-tone RU, and a third resource indication subfield used to indicate an allocation status on a 26-tone RU between the first 106-tone RU and the second 106-tone RU.

7. The transmit end according to claim 5, wherein the resource indication information is replicated on two 10-MHz bandwidths corresponding to the 242-tone RU.

8. The transmit end according to claim 1, wherein the first part of the fields comprises a legacy-long training field (L-LTF), the second part of the fields comprises a training field, and the training field and the L-LTF are jointly used for channel measurement in a space time block coding (STBC) scenario, wherein the training field occupies one symbol, the L-LTF is multiplied by a first column of a matrix $P_{2*2}$; and the training field is multiplied by a second column of the matrix $P_{2*2}$; and the matrix P is used to distinguish between a first space-time stream and a second space-time stream, wherein $$P_{2*2} = \begin{bmatrix} 1 & -1 \\ 1 & 1 \end{bmatrix}.$$

9. A receive end, comprising:

a transceiver to receive a physical layer protocol data unit (PPDU) sent by a transmit end, wherein a bandwidth of the PPDU is P×10 megahertz MHz, the PPDU comprises a first part of fields and a second part of the fields, wherein a quantity of tones per 10-MHz tone distribution corresponding to the first part of the fields is 64, and a tone spacing is 156.25 kHz, wherein a quantity of tones per 10-MHz tone distribution corresponding to the second part of the fields is 128, and a tone spacing is 78.125 kHz, and wherein P is a positive integer greater than or equal to 1 and wherein the first part of the fields comprises resource indication information, wherein the resource indication information is used to indicate resource unit RU allocation within a range of one or more 106-tone RUs, or the resource indication information is used to indicate RU allocation within a range of one or more 242-tone RUs.

10. The receive end according to claim 9, wherein each 10-MHz tone distribution corresponding to the second part of the fields comprises M1 26-tone resource units (RUs), M2 52-tone RUs, M3 106-tone RUs, M4 guard tones, M5 null tones, and M6 direct current tones, wherein M1×26+M2×52+M3×106+M4+M5+M6=128, and wherein M1, M2, M3, M4, M5, and M6 are integers greater than or equal to 0.

11. The receive end according to claim 10, wherein

M1=4, M2=0, M3=0, and M4+M5+M6=24; M41 guard tones and M42 guard tones are provided on two sides of the four 26-tone RUs, and M41+M42=M4, M1=0, M2=2, M3=0, and M4+M5+M6=24; M43 guard tones and M44 guard tones are provided on two sides of the two 52-tone RUs, and M43+M44=M4, M1=0, M2=0, M3=1, and M4+M5+M6=22; M45 guard tones and M46 guard tones are provided on two sides of the two 52-tone RUs, and M45+M46=M4, or M1=2, M2=1, M3=0, and M4+M5+M6=24; M47 guard tones and M48 guard tones are provided on two sides of the two 26-tone RUs and the one 52-tone RU, and M47+M48=M4.

12. The receive end according to claim 11, wherein

M1=2, M2=0, M3=0, M41=9, M42=8, M5=2, and M6=5,

M1=0, M2=2, M3=0, M43=9, M44=8, M5=2, and M6=5,

M1=0, M2=0, M3=1, M45=9, M46=8, M5=0, and M6=5, or

M1=2, M2=1, M3=0, M47=9, M48=8, M5=2, and M6=5.

13. The receive end according to claim 12, wherein when M41=9 and M42=8, M41 guard tones fall within a range of [−64, −56] and M42 guard tones fall within a range of [56, 63]; or M41 guard tones fall within the range of [56, 63] and M42 guard tones fall within the range of [−64, −56];

when M43=9 and M44=8, M43 guard tones fall within the range of [−64, −56] and M44 guard tones fall within the range of [56, 63]; or M43 guard tones fall within the range of [56, 63] and M44 guard tones fall within the range of [−64, −56];

when M45=9 and M46=8, M45 guard tones fall within the range of [−64, −56] and M46 guard tones fall within the range of [56, 63]; or M45 guard tones fall within the range of [56, 63] and M46 guard tones fall within the range of [−64, −56]; and when M47=9 and M48=8, M47 guard tones fall within the range of [−64, −56] and M48 guard tones fall within the range of [56, 63]; or M47 guard tones fall within the range of [56, 63] and M48 guard tones fall within the range of [−64, −56].

14. The receive end according to claim 9, wherein when the resource indication information is used to indicate the RU allocation within a range of one or more 242-tone RUs, for RU allocation within a range of any 242-tone RU, the resource indication information comprises:

a first resource indication subfield used to indicate an RU allocation status on a first 106-tone RU in the 242-tone RU, a second resource indication subfield used to indicate an RU allocation status on a second 106-tone RU in the 242-tone RU, and a third resource indication subfield used to indicate an allocation status on a 26-tone RU between the first 106-tone RU and the second 106-tone RU.

15. The receive end according to claim 9, wherein the resource indication information is replicated on two 10-MHz bandwidths corresponding to the 242-tone RU.

16. The receive end according to claim 9, wherein the first part of the fields comprises a legacy-long training field (L-LTF), the second part of the fields comprises a training field, and the training field and the L-LTF are jointly used for channel measurement in a space time block coding (STBC) scenario, wherein the training field occupies one symbol, the L-LTF is multiplied by a first column of a matrix $P_{2*2}$; and the training field is multiplied by a second column of the matrix $P_{2*2}$; and the matrix P is used to distinguish between a first space-time stream and a second space-time stream, wherein $$P_{2*2} = \begin{bmatrix} 1 & -1 \\ 1 & 1 \end{bmatrix}.$$

* * * * *